US006636908B1

(12) United States Patent
Winokur et al.

(10) Patent No.: US 6,636,908 B1
(45) Date of Patent: Oct. 21, 2003

(54) I/O SYSTEM SUPPORTING EXTENDED FUNCTIONS AND METHOD THEREFOR

(75) Inventors: Alexander Winokur, Haifa (IL);
Seweryn Mokryn, Framingham, MA (US); Marek Mokryn, Modi ' in (IL)

(73) Assignee: SANgate Systems, Inc., Southborough, MA (US)

( * ) Notice: Subject to any disclaimer, the term of this patent is extended or adjusted under 35 U.S.C. 154(b) by 496 days.

(21) Appl. No.: 09/605,493

(22) Filed: Jun. 28, 2000

Related U.S. Application Data

(60) Provisional application No. 60/141,322, filed on Jun. 28, 1999, provisional application No. 60/141,378, filed on Jun. 28, 1999, and provisional application No. 60/141,307, filed on Jun. 28, 1999.

(51) Int. Cl.$^7$ .................................................. G06F 3/00
(52) U.S. Cl. ................................ 710/29; 710/1; 710/20; 710/31; 709/233; 709/250; 711/4
(58) Field of Search .............................. 710/20, 8, 242, 710/307, 1, 31, 29, 33; 709/250, 233; 711/4

(56) References Cited

U.S. PATENT DOCUMENTS

| 4,435,762 A | | 3/1984 | Milligan et al. | |
|---|---|---|---|---|
| 5,025,500 A | * | 6/1991 | Phinney | 370/462 |

(List continued on next page.)

FOREIGN PATENT DOCUMENTS

| EP | 95300673.1 | 2/1995 |
|---|---|---|

(List continued on next page.)

OTHER PUBLICATIONS

Montague, Robert M. et al., "Virtualizing the San—A New Link Emerges in the San Value Chain", Morgan Keegan & Company—Equity Research, pp 1–19, (Jul. 5, 2000).

*Primary Examiner*—Jeffrey Gaffin
*Assistant Examiner*—Angel L Casiano
(74) *Attorney, Agent, or Firm*—Hale and Dorr LLP

(57) ABSTRACT

A device, system and methods of data management are disclosed, which facilitate the implementation of improved mirroring, back-up, volume remapping, extent relocation, prefetching, caching, data reformatting, statistic gathering, and data translation, among others. A new, intelligent I/O stream splitter is disclosed that may intercept and alter an I/O stream received by the splitter from a communications link. For example, in the case of mirroring, the intelligent splitter may intercept write commands and associated data from a mainframe that target a specific storage location on a specific control unit. The splitter may then transmit the intercepted I/O stream to the targeted control unit and storage location over one link and in parallel transmit on another link an altered version of the intercepted I/O stream to another control unit, which is responsible for holding a mirrored version of the data. The altered version could have the same data as that on the one link but have new frame headers injected at appropriate points in the I/O stream. Moreover, the intelligent splitter may improve the functionality of extended functions such as mirroring as well. The alterations to the I/O stream to the mirroring control unit may include changes to the control information of the I/O stream, for example, to address the mirroring control instead of the primary unit. But the alterations may also include changes to the data itself, including formatting, filtering and translating. A host may be connected to potentially several intelligent splitters to implement extended functions cooperatively. Among other things, the host may be used to configure the splitter to perform the mirroring (or other) operation at a physical level of addressing, though the host may receive requests expressed at a logical level. The host may then map the logical name to physical addresses and configure the splitter accordingly. The host may also instruct the splitter to create and send streams independently of any I/O streams passing through the splitter. This created I/O stream may correspond to an entire CCW in ESCON contexts.

15 Claims, 11 Drawing Sheets

U.S. PATENT DOCUMENTS

| | | | |
|---|---|---|---|
| 5,159,671 A | | 10/1992 | Iwami |
| 5,264,958 A | * | 11/1993 | Johnson ...................... 710/315 |
| 5,297,262 A | * | 3/1994 | Cox et al. ..................... 710/36 |
| 5,404,487 A | | 4/1995 | Murata et al. |
| 5,758,125 A | | 5/1998 | Misinai et al. |
| 6,181,684 B1 | * | 1/2001 | Turcotte et al. ............. 370/332 |
| 6,470,397 B1 | * | 10/2002 | Shah et al. ................. 709/250 |

FOREIGN PATENT DOCUMENTS

| | | |
|---|---|---|
| JP | 56087377 | 6/1981 |
| JP | 02279265 | 10/1990 |
| JP | 07329141 | 12/1995 |
| JP | 09248585 | 9/1997 |
| WO | WO 93/12487 | 6/1993 |
| WO | WO 95/22865 | 8/1995 |
| WO | WO 98/20647 | 5/1998 |

\* cited by examiner

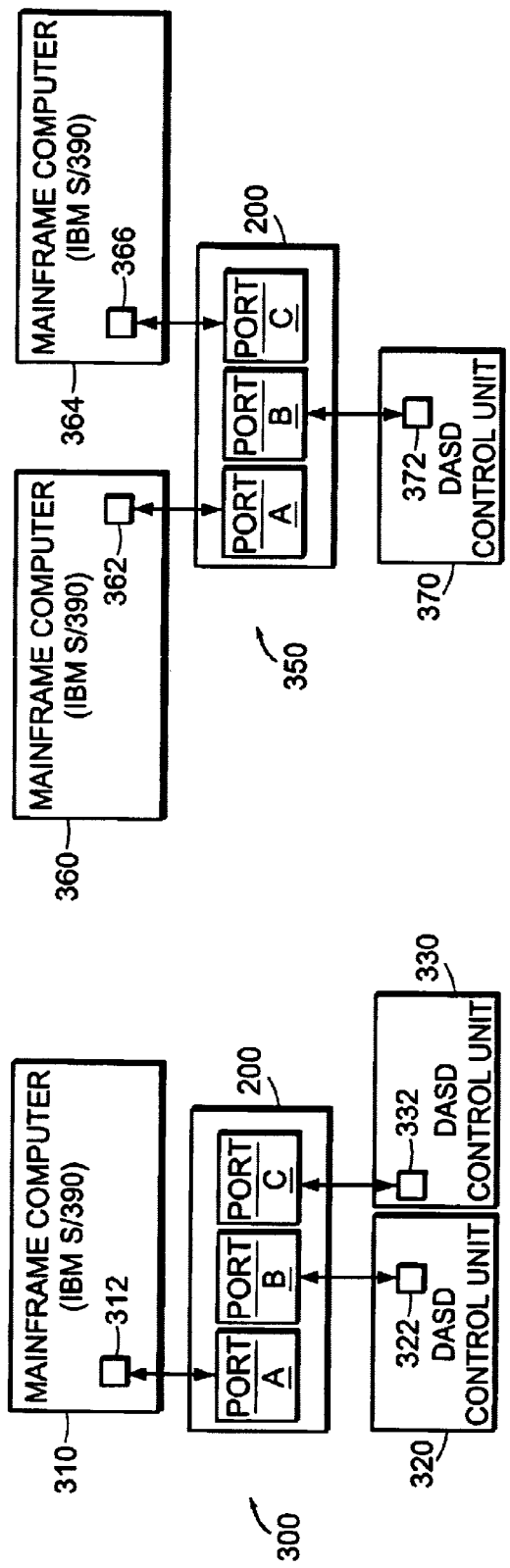
FIG. 3B
FIG. 3A
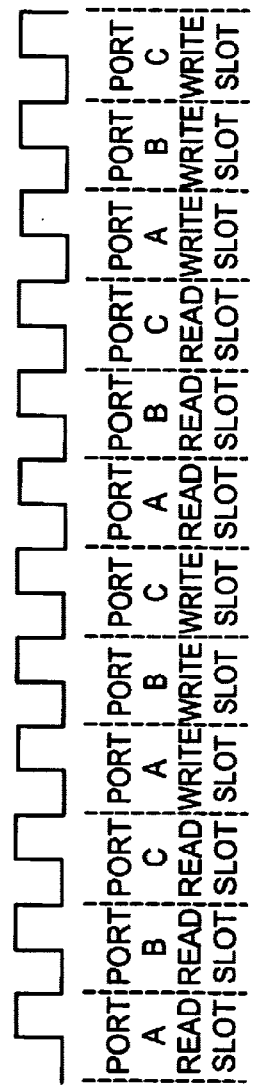
FIG. 4

I/O SYSTEM SUPPORTING EXTENDED FUNCTIONS AND METHOD THEREFOR

This application claims the benefit of provisional applications Nos. 60/141,322, 60/141,378 and 60/141,307, all filed Jun. 28, 1999.

BACKGROUND OF THE INVENTION

The present invention relates to data management. More specifically, the present invention relates to methods and apparatuses for managing large amounts of data, for example, in storage area networks and mainframe I/O environments.

The demands for managing large amounts of data have steadily increased in recent years and are expected to continue to increase in the future. For example, large organizations such as airlines and financial institutions require continuous, reliable, around-the-clock access to their "mission critical" data. Temporary interruptions in the accessibility to this data, or the loss of portions of this data, can be catastrophic to such organizations. Complicating the management task, many organizations have an enormous and growing amount of mission critical data (e.g., many terabytes). Much of this data is managed by mainframe-based computer systems.

FIG. 1 shows a block diagram of an exemplary prior art computing system 100, which is described here to illustrate common management tasks and associated problems. System 100 includes two mainframe computers 110A, 110B, three direct access storage devices (DASDs, also known as "control units") 120A, 120B, 120C, and a director 150. The various components communicate with one another via "point-to-point" communication links 160, 162, 164, 166, 168, 170, and 172 according to a defined protocol. The common protocol is the ESCON protocol, also known as the SBCON protocol (hereinafter, collectively called "ESCON").

In this exemplary system, port 114A of computer 110A is coupled to port 122B of control unit 120B via link 162. Port 112B of computer 110B is coupled to port 124B of control unit 120B via link 164. Port 114B of computer 110B is coupled to a port (not shown) of director 150 via link 166. Port 126B of control unit 120B is coupled to another port (not shown) of director 150 via link 168. Port 124C of control unit 120C is coupled to a port (not shown) of director 150 via link 170. In each case, the physical link and protocol are ESCON compliant. Finally, port P1 of control unit 120A is coupled to port P2 of control unit 120B via a proprietary communication link 172, in which the physical link is ESCON but which is used to carry proprietary commands and data, for example, to implement certain "extended functions" (more below). For convenience of illustration, each computer 110A, 110B is illustrated as including two ESCON ports 112, 114.

In the illustrated embodiment, the mainframe computers are IBM S/390s. Exemplary IBM S/390 mainframe computer may include between sixteen to 256 ESCON communication ports.

Each exemplary DASD control unit 120, for ease of description, is shown as including three ESCON communication ports 122, 124, 126, and optionally additional private links P1, P2, though a typical DASD control unit may include between 2 and 64 ESCON ports. The illustrative DASD control units 120 include a main memory 130, a controller 132, a persistent storage 134, and three memory buffers 123, 125, 127, each buffer being associated with a corresponding ESCON port. Each port can write data into, and read data out of, its associated buffer. The controller 132 can write data into, and read data out of, all of the buffers or move data to or from persistent storage 134 via an internal system bus 136.

A director 150 improves connectivity in a storage network by allowing one mainframe computer port to connect to two or more control units.

As mentioned above, the various components may communicate using the ESCON protocol. Under ESCON, the components communicate according to "chains" of one or more channel command words (CCWs). Each CCW, in turn, is communicated in three phases: a "command phase," a "data phase," and a "status phase" with each phase using a known vocabulary of messages. During each phase, information is transmitted as "frames," which are 1 kilobyte or less in size and include control (or header) and data (or payload) portions. A given phase may involve known flow control and/or handshaking and may involve many frames. For example, the protocol permits 64 kilobyte transfers, which could require 64 frames during the data phase. The data phase uses a flow control technique in which an initiator expresses a desire to transmit or read a certain amount of data (e.g., in a prior write command), and the receiver replies with a data request message indicating the size of data that may be sent by the transmitter and received by the receiver. A series of such requests may be needed to transfer the entire "exchange."

The I/O protocols rely on a concept of virtual links connecting "virtual mainframe machines" with "virtual control units. Some of the I/O protocols, which are connection oriented, like ESCON and SCSI, allow only one connection to be active at any moment in time, while others may actually frame multiplex the information among the various virtual links. Virtual links are effectively identified by the frame header information specifying both physical and logical addresses, and the components can detect virtual connections and disconnections from analyzing specific bits in certain frames.

As alluded to above, commercially available control units offer "extended functions."Extended functions implement features above and beyond basic device operations like read or write. (The actual functions implemented by a device are defined in the device specification, such as a specification of a control unit.) For example, two popular extended functions are known as "concurrent copy" and "remote copy," which are used, respectively, for maintaining backup copies or for "mirroring" data to other storage as it is written to its target. Known extended functions operate at a physical level of addressing (e.g., volume numbers and tracks) as opposed to operating at the logical level (e.g., files or the like). Referring back to FIG. 1, a control unit may perform back-up to another disk controlled by another control unit by using a dedicated ESCON link 172, connecting the two control units. Proprietary software (sometimes referred to as firmware), executing on the control units, performs the necessary operations over the link 172 to send the data to be backed up from one control unit to another.

In the above approach to mirroring, data is effectively written to the control units sequentially, first to the primary control unit and then from the primary control unit to the control unit doing the mirroring. This introduces delay and complication as the data is written between the control units. The backup approach is also sequential. These approaches require dedicated communication links 172 that cost port connections on the control units.

Moreover, because prior art extended functions are built using proprietary embedded software (also known as "firmware") to and between control units, third parties cannot practically create additional functions for the control units. To date, the extended functionality is largely limited to homogenous systems of control units. That is, the extended functions generally do not work when control units from different manufacturers are involved in a network.

Clustering is similar to mirroring in that some data is effectively mirrored to storage associated with another processor. However, rather than mirroring information in case a subsequent failover or switchover to another storage proves necessary, clustering usually involves mirroring (or replicating) only specific information so that the processors may act collaboratively and in distributed fashion.

SUMMARY OF THE INVENTION

The inventions provides devices, systems, and methods of replicating and manipulating I/O information to improve efficiency and functionality. Preferably, the invention intercepts I/O information as it is transmitted between a computer (e.g., mainframe) and storage system (e.g., DASD storage controller).

Under certain aspects of the invention, an intelligent splitter device includes a buffer memory and at least three input/output (I/O) ports. Each port includes logic for transmitting and receiving information on an associated input/output (I/O) communication link, and each port is in electrical communication with the buffer memory. Control logic controls each port to write I/O data received from its respective I/O communication link into a portion of the buffer memory associated with that port. The control logic also controls each port to transmit data onto its respective I/O communication link by reading data from the buffer memory at selectable buffer memory locations, including locations associated with one of the other ports.

Under another aspect of the invention, the control logic can create both control and data frames. These frames may be created independently of any of the streams received by the intelligent splitter device.

Under other aspects of the invention, an intelligent splitter device communicates according to a frame-based I/O protocol in which each frame includes a header component and a payload component. The device includes a buffer memory and at least three input/output (I/O) ports. Each port has logic for transmitting and receiving information on an associated input/output (I/O) communication link, and each port is in electrical communication with the buffer memory. Control logic controls each port to write I/O data received from its respective I/O communication link into a portion of the buffer memory. And the control logic further includes logic to analyze a received frame and in response thereto create and transmit a modified version of the received frame on one of the I/O ports. The modified version of the frame includes a modification to at least one of the header component and the payload component of the received frame.

Under other aspects of the invention, an intelligent splitter device is used for communicating according to a multiphase I/O protocol having a command phase, a data phase, and a status phase in which the data phase has at least one data frame. The splitter includes a buffer memory and at least three input/output (I/O) ports. Each port has logic for transmitting and receiving information on an associated input/output (I/O) communication link, and each port is in electrical communication with the buffer memory. Control logic causes at least two of the ports to transmit in parallel data phase information.

Under another aspect of the invention, an intelligent splitter device is used for communicating according to a multiphase I/O protocol having a command phase, a data phase, and a status phase, in which the data phase comprises at least one data frame. The splitter includes a buffer memory and at least three input/output (I/O) ports. Each port has logic for transmitting and receiving information on an associated input/output (I/O) communication link, and each port is in electrical communication with the buffer memory. Control logic causes at least one port to transmit control phase information stored in the buffer. In parallel therewith, the control logic also causes at least one other port to transmit a modified version of the control phase information that is transmitted on the first port.

Using the above aspects, I/O information can be received on a first port of the communication device having at least three ports. The communication device can transmit the I/O information received on the first port to a second port of the communication device, and the communication device can transmit a modified version of the I/O information received on the first port to a third port of the communication device.

Moreover, I/O information can be received on a first port of the communication device, and the communication device can transmit a modified version of the information to one of the second and third ports of the communication device. Or, at least selected I/O information can be cached in the communication device, and I/O information can be received on a first port of the communication device. The received I/O information can be analyzed to determine physical address data of the I/O information, and the cached I/O information can be transmitted on the first port if the received information hits the cache. The received information can be transmitted on one of the second and third ports if the received information misses the cache.

Under another aspect of the invention, an intelligent splitter system includes an I/O device and a host system. The I/O device includes input/output (I/O) port logic for transmitting and receiving information on at least three I/O communication links according to a standardized I/O protocol. Under the protocol I/O operations may be requested on storage locations identified by physical address information. The I/O device further includes extended function logic that cooperates with the port logic to perform at least one extended function not specified in the standardized I/O protocol. The at least one extended function operates in a physical address domain of physical addresses. The host system has a processor and memory storing processor-executable instructions to map logical storage object names to a physical address domain. It also stores instructions to configure the I/O device with a mapped physical address domain to enable the I/O device to perform the at least one extended function on the physical address domain corresponding to a mapped logical storage object name.

Under other aspect of the invention, a command can be received to perform an extended function on data identified by a logical object name. The logical object name can be mapped to a physical address domain, and a communication link in the I/O system can be monitored to determine if the link is carrying an I/O operation in the mapped physical address domain. If an I/O operation is being carried on the link within the mapped physical address domain, that operation can be intercepted and the extended function identified in the received command can be performed.

Under another aspect of the invention, I/O information is received from one of the two communication links into a first multi-port device having a processor and memory. The memory has instructions to determine if I/O information received on the link is within a first predefined set of I/O operations, and the first multi-port device is connected to a first storage system. I/O information is also received from a second of the two communication links into a second multiport device having a processor and memory. This memory also stores instructions to determine if I/O information received on the link is within a second predefined set of I/O operations, and the second multi-port device is connected to a second storage system. If the received I/O information on the one communication link is within the first predefined set of I/O operations, the received I/O information is sent to the first storage device and an I/O operation is sent to a port of the second multi-port device. If the received I/O operation is not within the predefined set, the received information is sent to the first storage system. Similar actions to the above take place with respect to the second link.

BRIEF DESCRIPTION OF THE FIGURES

In the Drawing,

FIGS. 3A–B are diagrams of exemplary systems using intelligent splitters according to a preferred embodiment of the invention;

FIG. 4 shows a bus utilization scheme according to a preferred embodiment of the invention;

DETAILED DESCRIPTION OF THE PREFERRED EMBODIMENTS

Overview

Preferred embodiments of the invention facilitate the implementation of many useful data management applications and functions, such as improved mirroring, back-up, volume remapping, extent relocation, prefetching, caching, data reformatting, statistic gathering, and data translation, among others.

Figure 1:
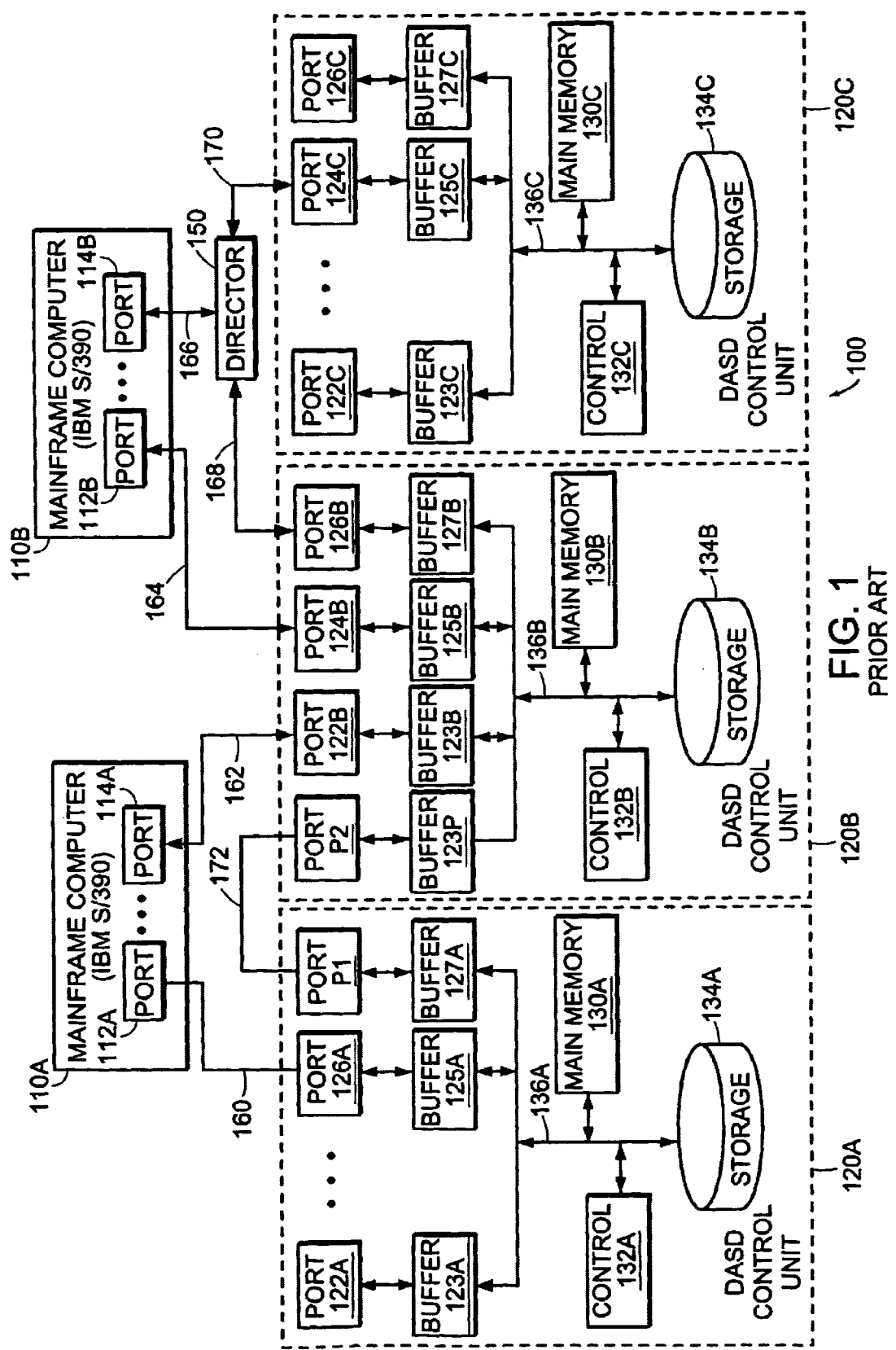
FIG. 1 is a system diagram of an illustrative prior art computer system including control units and other devices.
Figure 2A:
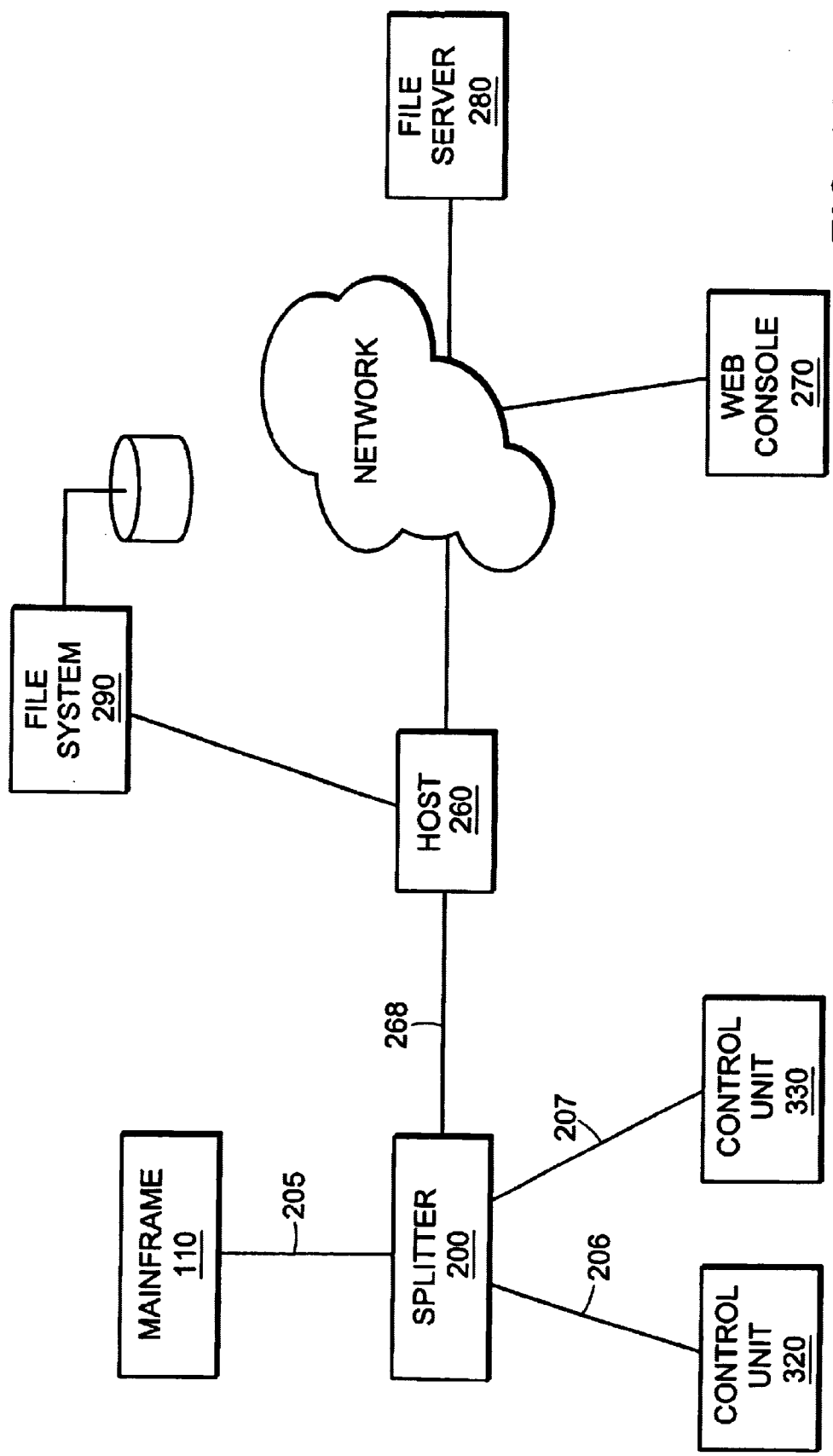
FIGS. 2A–D show the architecture of intelligent splitter devices in communication with a host according to a preferred embodiment of the invention.

Referring to FIG. 2A, to improve the efficiency of many of these functions and applications, preferred embodiments use a new, intelligent I/O stream splitter 200 that may be programmed to intercept and alter an I/O stream received by the splitter from a communications link 205. For example, in the case of mirroring, the intelligent splitter 200 may be programmed to intercept write commands and associated data from a mainframe 110 that target a specific storage location on a specific control unit 320. The splitter 200 may then transmit the intercepted I/O stream to the targeted control unit and storage location over link 206 and in parallel transmit on link 207 an altered version of the intercepted I/O stream to another control unit 330, which is responsible for holding a mirrored version of the data. The altered version could have the same data as that on link 206 but have new frame headers injected at appropriate points in the I/O stream. Transmitting the I/O streams in parallel is more efficient than the sequential approach used in the art (e.g., from a mainframe host to a primary control unit, and from the primary control unit to a mirroring unit over a dedicated link). Not only is the parallel approach faster it avoids the use of dedicated inter-control unit communication links.

Moreover, the intelligent splitter may improve the functionality of extended functions such as mirroring as well. The alterations to the I/O stream to the mirroring control unit 330 may include changes to the control information of the I/O stream, for example, to address the mirroring control instead of the primary unit 320. But the alterations may also include changes to the data itself. For example, if the mirroring control unit 330 organizes data differently (e.g., different size chunks) than the primary control unit 320, the splitter 200 may be programmed to format the intercepted stream to a form appropriate for the mirroring control unit 330. In addition, the splitter may be programmed to filter the I/O stream (e.g., detect and remove specific data patterns) or translate it (e.g., changing EBCDIC to ASCII). Thus, unlike the prior art, the splitter 200 permits functions to operate with multiple, heterogeneous control units and to have write visibility into the I/O stream itself to alter both the header and payload components of frames.

Preferred embodiments further include a host 260 connected to potentially several intelligent splitters. The host and splitters may be programmed to implement extended functions cooperatively. Among other things, the host may be used to inform a splitter of the functions and applications that the splitter 200 should perform. For example, in the above case, the host 260 might instruct a splitter 200 to watch I/O streams passing through the splitter and to take the above described transmission and alteration operations if the I/O stream being watched falls into a physical address range of interest, e.g., the range that is desired to be mirrored. Thus, the host 260 may be used to configure the splitter to perform the mirroring (or other) operation at a physical level of addressing.

In addition, the host 260 may instruct the intelligent splitter 200 to create and send streams independently of any I/O streams passing through the splitter. For example, to implement a form of backup copying, the host 260 might instruct the splitter 200 to create and send an I/O stream to a control unit 320, to read a specific track of data and to store that data in the splitter 200 and/or the host 260. This created I/O stream may correspond to an entire CCW in ESCON contexts. Afterwards, the host 200 might instruct the splitter 200 to create another I/O stream to write that data to another control unit 330 that is responsible for holding backup data.

The host 260 may also be used to communicate with file systems 290 and computer systems 280 using other communication and storage protocols. For example, the host may communicate with an open systems file server 280 using TCP/IP to obtain metadata about files managed by that server. The metadata may then be used to map logical objects (e.g., files, directories) with physical objects and addresses (e.g., tracks and volumes). This mapping information may then be used to implement the above-type of extended functions and applications on a logical level. For example, the host 260 cooperating with a splitter 200 may implement caching of files by file names, or back-up information to an open systems file server 280 using filenames. In addition, the host 200 may provide a communication path for alternative protocols. For example, the host 260 may communicate information with the splitter 200 and thus have access to information in control units 320, 330 connected to that splitter, but it also may coordinate communication with other file systems, e.g., 290, using other protocols such as fibre channel (FC). The host 260 may also be used to implement web-based consoles 270 to administer the system.

Preferably, the splitter 200 and host 260 are implemented with defined application program interfaces (APIs) to allow third parties to develop and introduce applications and new extended functions into a system. By implementing the extended functions and applications in the splitter 200 and/or the host 260, not only are new, useful functions more easily realized, they are decoupled from the control units. Thus, less complicated and sophisticated control units may be used in the system, thereby reducing ownership cost for an overall storage system.

As outlined above, preferred embodiments may be used to improve the functionality and efficiency of many applications and functions. One application not mentioned above but that can benefit from preferred embodiments is clustering. In particular, preferred embodiments may be used to receive information passing between a mainframe and a control unit. The splitter may be used to detect a subset of this information that is of interest for a clustering environment and pass that information (modified or unmodified depending on the application and environment, e.g., type of equipment used) to another computing system involved in the cluster. Under this arrangement, the splitter may be configured to work directly with a control unit, thus potentially obviating the need for a device that can communicate on at least three I/O ports. Instead, only two I/O ports are needed (e.g., ones that can communicate according to a defined multi-phase protocol) and a private communication path to a control unit are needed.

Hardware Architecture for Intelligent Splitter

The intelligent splitter 200 of a preferred embodiment is a multiport programmable device that has visibility into I/O streams passing through it and that can alter the streams under programmatic control. As will be explained in more detail below, the splitter may receive and transmit I/O streams on multiple ports. In one embodiment, the streams are received into a buffer that a local processor may access. Programs running on the processor may then analyze the streams and retransmit them on potentially multiple ports and it may potentially alter the stream before doing so for example by injecting headers and/or altering payloads of frames. Moreover, the programs may create and send I/O streams independently of any received stream.

Figure 2B:
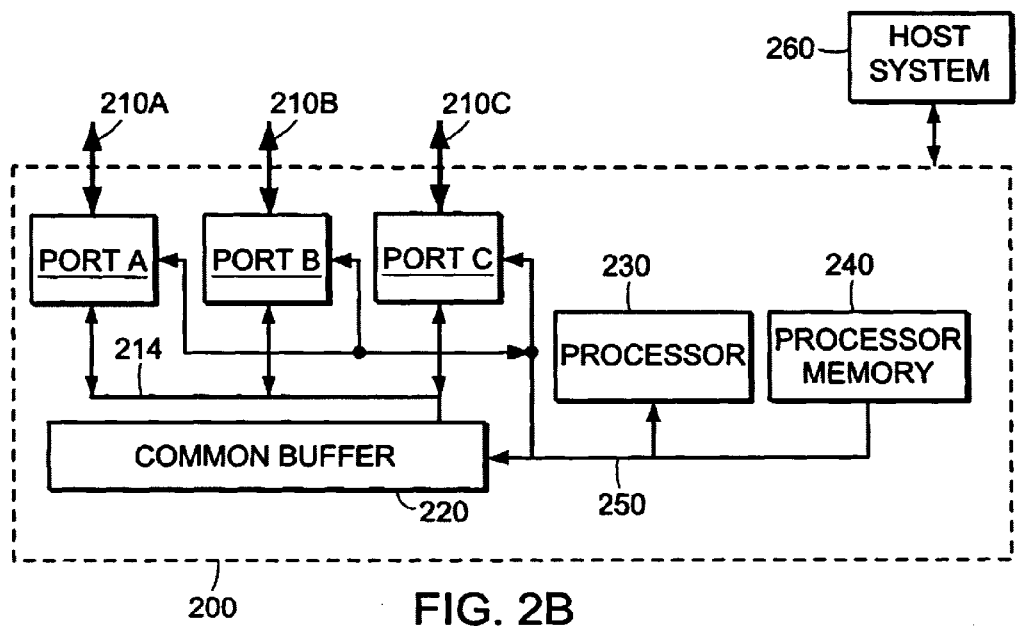

FIG. 2B is an architectural diagram of a three port intelligent splitter 200 according to one embodiment of the invention. Intelligent splitter 200 includes Port A, Port B, Port C, a common buffer 220, a local processor 230, and a local processor memory 240, communicating via a local bus 250, Ports A, B, and C communicate with external links 210A, 210B, and 210C to receive and transmit data over the link, for example, according to the ESCON protocol. In this fashion, Ports A, B, and C may participate in a communication having a chain of CCWs. This communication may be with a mainframe host, DASD control unit(s), a director or other appropriate devices depending on the configuration of the system or network. In addition, Ports A, B, and C each communicate with common buffer 220 via bus 214. In one embodiment, each Port has read visibility into the entire buffer 220, but has write visibility limited to specific buffer areas associated with the Port.

The common buffer 220 is used to store frames received from a link via a Port. In addition, the buffer 220 may hold frames created by processor 230.

The local processor 230 runs software in memory 240 to control the splitter 200 to provide "intelligence" to the splitter 200. For example, the processor may run software that can read and/or write state to the Ports to control their operation. In addition, since the processor 230 may communicate with the common buffer 220, programs may be run to read and/or write information to the common buffer 220. These latter programs, for example, may be used to analyze or alter received I/O streams or to create stream information for transmission (i.e., independently of a received stream). Moreover, as will be explained below, the processor 230 also can communicate with a host system 230 that may be shared with other splitter devices.

Local bus 250 facilitates the communication among the processor 230, the common buffer 220, Port A, Port B, Port C, and the processor memory 240. The bus allows interrupt, command, address and data information to be passed among the various entities communicating with the bus 250. In one embodiment, each entity on the bus 250 has a unique address space. In this fashion, processor 230, for example, may write state to Port A by sending a write command on the local bus 250 with an address that Port A will recognize as its own.

Though many bus access schemes are suitable, one embodiment uses a time division multiplexing scheme for bus 214 in which each Port has dedicated bus time slots and in which reads are grouped together and writes are grouped together, see, e.g., FIG. 4. This bus access approach assures that each Port will have sufficient buffer bandwidth to handle the I/O streams. In this fashion, each of the Ports may read data or write data only during a predefined timeslot.

Figure 2C:
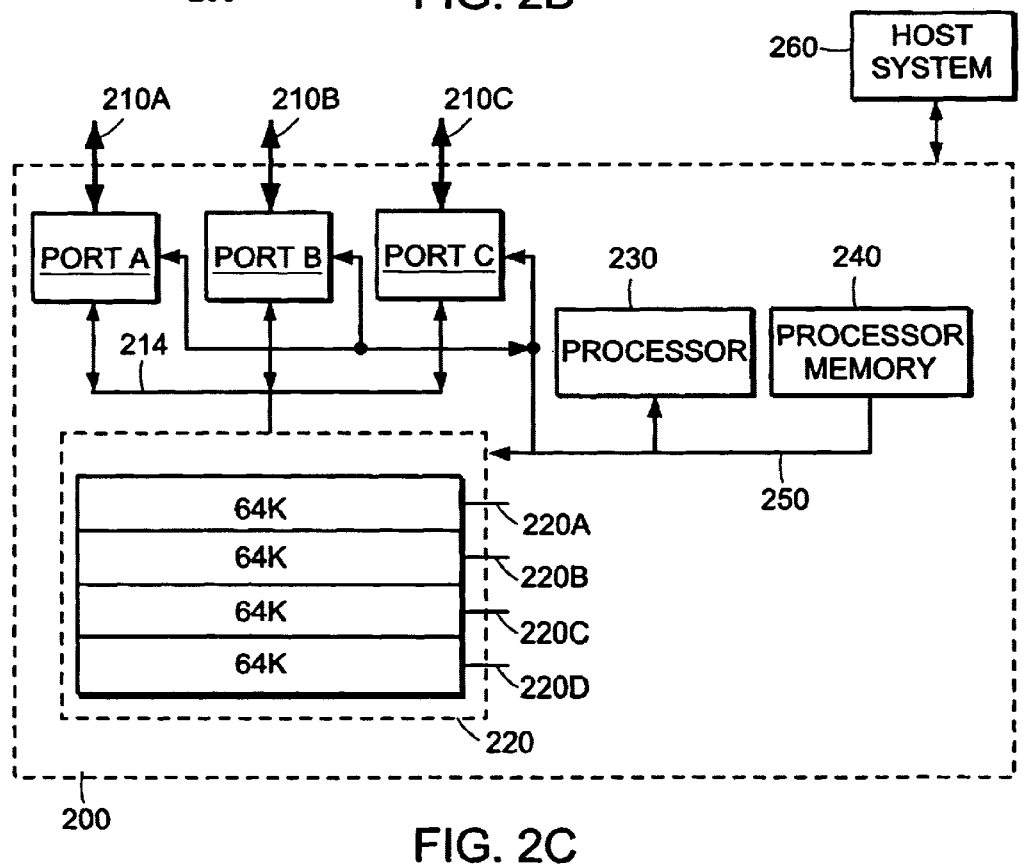

FIG. 2C shows an exemplary architecture for common buffer 220 in more detail. In this arrangement, the unique address space of common buffer 220 is subdivided so that each Port and processor 230 is associated with a unique sub-address space for their respective write operations to the buffer 220. Each of the Ports and the processor 230 can read data from any location in the common buffer 220. For example, the common buffer 220 may be logically divided into four equally-sized, non-overlapping, memory segments 220A, 220B, 220C, and 220D with Port A associated with memory segment 220A, Port B associated with memory segment 220B, Port C associated with memory segment 220C, and processor 230 associated with segment 220D. For an embodiment particularly suitable for ESCON, each Port is an ESCON port, and the buffer 220 is at least 256 Kb in size with each Port-associated buffer segment being at least 64 Kb. In this embodiment, the bus 214 is capable of operating at a bandwidth of at least 120 Mbytes/sec to support three ESCON ports. For example, the bus 214 and buffer 220 may have a 32-bit width and each must be capable of executing 30 Mega-operations per second.

In one embodiment, the address space subdivision is accomplished with hardware assistance. Each buffer segment during write operations from a Port (e.g., during a receive operation on the respective link) addresses the segment with a programmable looping buffer address counter that effectively makes the Port-associated buffer segment a circular buffer for receive operations from a Port (i.e., write operation to buffer 220). The "circling" address values corresponds to the segment's address space. As will be explained further below, software may write to certain registers within a given Port and thus control the write operations; for example, software may write to registers in a Port to indicate a starting buffer address at which to start writes.

Figure 2D:
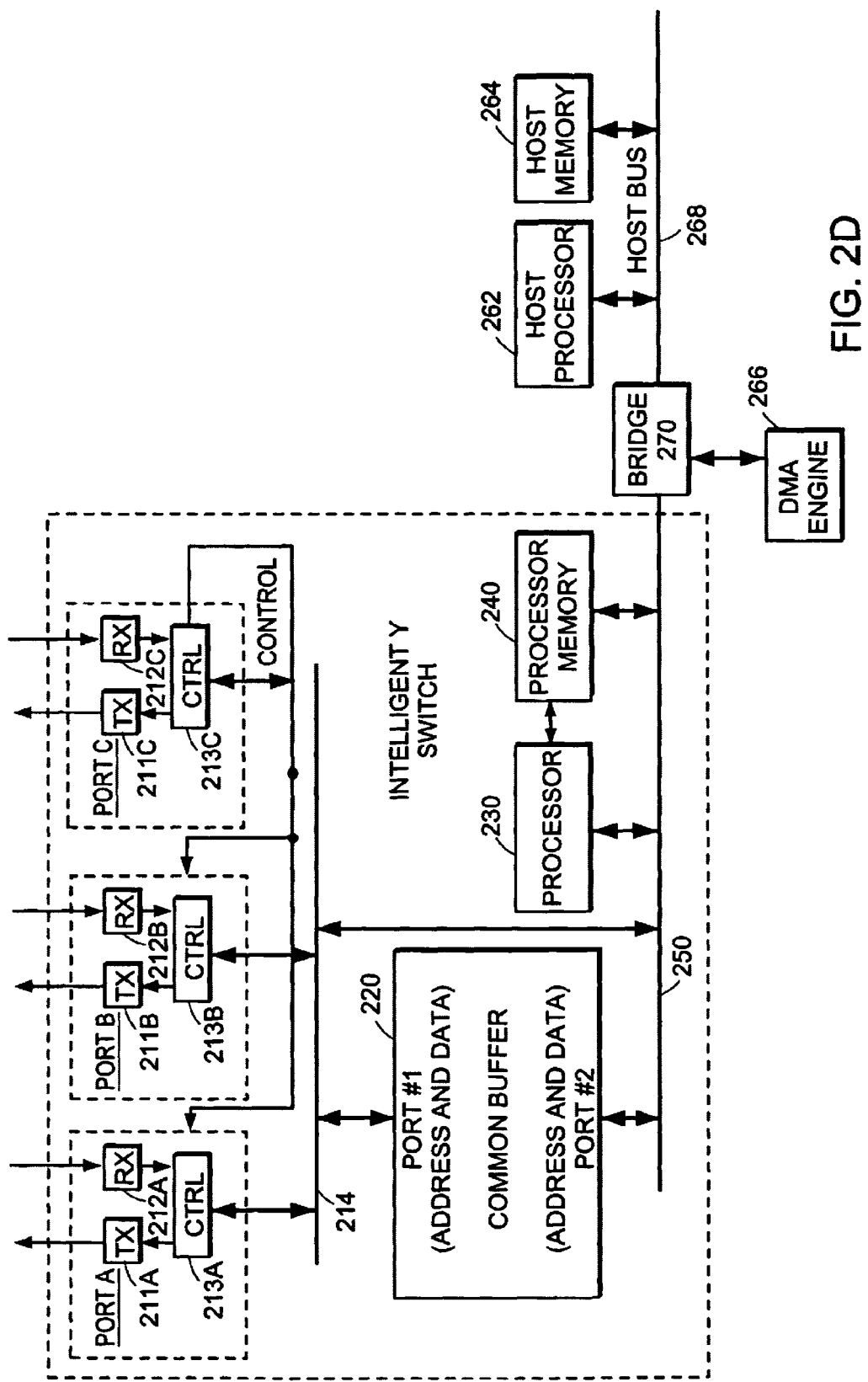

FIG. 2D shows further detail of an exemplary intelligent splitter 200. In this embodiment, each of Ports A, B, and C includes transmit logic 211, receive logic 212, and control logic 213. The transmit logic 211 is primarily responsible for sending data to an external link; the receive logic 212 is primarily responsible for accepting data from an external link, e.g., 210A; and the control logic 212 is responsible for coordinating the actions of the transmit logic 211 and the receive logic 212. This coordination may be controlled by software executing on local processor 230, as further described below.

As stated above, the transmit logic 211 is primarily responsible for sending data to an external link. In one embodiment, the transmit logic 211 operates in response to control registers in control logic 213. The frame information to be transmitted (both header and at least some payload) reside in buffer 220. (Only some of the payload need be present to implement streaming, as explained below). The frame information may be identical to that received from one of the Ports and stored in the buffer 220, or it may be modified by software from such frame information, or it may be independently created by software. By setting a "start transmission"bit in a control register (not shown), the transmit logic 211 begins to transmit a frame(s) onto a corresponding link. In particular, the transmit logic reads data from the buffer 220 starting at an address loaded in a "frame header starting address" register, and as the data is read, it is transmitted through the transmitter logic onto the link. This reading and sending is for a specified amount of data (e.g., ESCON has 9 byte headers). Afterwards, the transmit logic 211 reads and transmits data from the buffer 220 starting at an address loaded in a "frame payload starting address" register for a specified amount of data (e.g., indicated in a length register). Once the frame is sent, the transmit logic 211 sends an interrupt to the processor 230. One embodiment of the transmit logic 211 includes scatter/gather logic. In this fashion, the data to be transmitted on a link need not be in contiguous space in buffer 220. Thus, this logic facilitates transmissions in which a frame header and a payload are in discontiguous space in buffer 220, and may facilitate the support of protocols having virtual links.

As stated above, the receive logic 212 is responsible for accepting data from an external link, e.g., 210A. As data is received from a link, the receive logic 212 writes the frame data into the buffer 220 at a starting address specified in a control register (not shown). The starting address of the control register may be set by software. As writes occur, the write address register increments circularly corresponding to that Port's address space in buffer 220, and a byte length value is incremented accordingly. The receive logic 212 includes interrupt logic to signal data transfer events to processor 230. One embodiment allows the software to select the type of data transfer event to cause an interrupt by setting appropriate bits in a control register. For example, an interrupt may be selectably sent when a frame has been received without error, or an interrupt may be selectably sent when a specified byte count has been reached (e.g., to signal the reception of a frame header or to signal that an appropriate amount of a data frame has been received to begin data streaming, as explained below). In addition, the receive logic can distinguish between data frames and non-data frames being received. This distinction may be conveyed as distinguishable frame receive interrupts or by holding pollable state indicating the type of frame received. In one embodiment, the receive logic may be configured to send an interrupt when a first data frame is received, and/or to send an interrupt when all data in an exchange has been received. (These interrupts are described in further detail in a later section.) One embodiment of the receive logic 212 implements write overflow protection to detect if an initiator has attempted more data than it was permitted and to prevent overwriting in such case. Depending on the implementation, the receive logic 212 might perform other functions such as generating parity or ECC bits for the data written to buffer 220.

The control logic 213 includes the various registers described above to control the transmission and reception processes. The various registers may be mapped to their own unique address space and may be accessed by software executing on processor 230 via bus 250. (These control features are also described in a later section.) The control logic also includes logic for detecting and generating interrupts as described above and for coordinating the access onto bus 214 and bus 250.

Many physical implementations of the above logic are realizable. One embodiment implements the logic for the three Ports A, B, and C, on a single field programmable gate array (FPGA) chip; uses an Intel i960 processor chip or a Motorola PowerPC processor chip for processor 230; commercially-available memory chips for memory 240, and commercially-available dual-ported storage for the common buffer 220. Ports may access the buffer 220 via one buffer port, and the processor 230 (and potentially a host 262 or DMA Engine 266) accesses buffer 220 through another buffer port. Preferably, Ports A, B, and C and the corresponding links are each full duplex ports. The splitter 200 also includes other known hardware (not shown) to assist in reception and transmission, such as delimiter bit detection and insertion, CRC processing and insertion, electrical to optical transceivers, parallel to serial conversion and the like. In addition, the Port logic includes mechanisms for detecting protocol-specified error conditions and for sending interrupts in such cases.

As outlined above, the Ports and other aspects of the splitter 200 are visible on bus 250 and thus to the processor 230. In addition, the components may communicate with the processor 230 via interrupts and associated polling. The handling of such interrupts and the setting of appropriate Port state is the responsibility of software, in a preferred embodiment. Software executing on the splitter 200 is responsible for at least initial action on handling interrupts, but this software may cooperate with other software on the splitter and/or the host system 260, as described further below.

FIGS. 2A–D show that exemplary intelligent splitter 200 may communicate with a host system 260 via a bus 268. This communication path may require separate logic 270, for example, to bridge the bus 268 with the local bus 250 of the intelligent splitter. Alternatively, the bridge logic 270 may be integrated into the processor 230 as is known in the art. FIG. 2D illustrates a DMA Engine 266 separately as a convenient descriptive shorthand to show the relevant functionality; this logic may be separate, integrated in bus bridge hardware 270 or provided by the local processor 230.

Although the host 260 is not part of intelligent splitter device 200, the intelligent splitter supports such communication so that more feature rich systems may be constructed by combining the splitter with a host 260 and possibly with other splitters, e.g., see FIG. 7 described below. The path 268 allows a host system to, among other things, read data from, and write data to, the common buffer 220 and the processor memory 240 either directly or indirectly. In this way, the host 260 may load software for the processor 230 to execute, may establish configuration parameters, and may pass messages to the processor 230. Though not shown as such in FIG. 2D, the host processor 262 and memory 264 are part of a complete host system 260 that, among other things, includes non-volatile storage and a network connection(s), see, e.g., FIG. 2A.

Software Architecture

Under a preferred embodiment, the splitter 200 operates on I/O streams at a physical address level, and the host 260 is responsible for implementing functionality at a logical level. Under this arrangement, the splitter 200 is configured by the host 260 to take certain actions when I/O streams fall within prescribed, physical address domains (e.g., physical volumes, tracks, sectors, and physical blocks). This specification of a physical address domain and associated actions to be performed is called a "session definition." For example, with regard to a mirroring function, a session may define that all I/O streams received on Port A occurring within a specified physical domain (i.e., the domain to be mirrored) should result in that identical stream being sent on Port B (e.g., connected to the primary control unit 320), and that an altered stream be sent on Port C (e.g., connected to a control unit responsible for holding mirrored data); the alterations to be made to the stream for Port C would be defined to include specific changes to control information to reflect the different address to be used for the mirrored data.

In a preferred embodiment, the host 260 configures the splitter by communicating session definitions to the splitter 200. However, the host, unlike the splitter, may be programmed to understand a logical level of addressing abstraction (e.g., databases, file systems, logical records) and can map logical-level objects to a corresponding physical address domain. Thus, the host can configure the splitter to implement extended functions at a physical level, but the host may be used applications and users to provide functionality at a logical level. For example, an administrator may instruct the host to mirror a file. The host would map this logical object to the physical domain and configure an appropriate splitter accordingly.

Under a preferred embodiment, the software on the host and splitter may cooperate to send CCWs or a chain of CCWs on a link. Thus, the combination may be made to mimic a mainframe host or control unit. This ability to create and send CCWs is useful in implementing data management functions and applications. For example, with regard to the mirroring example, CCWs may be used to perform reads from the primary control unit and writes to the mirroring control unit to synchronize their relevant state before a mirroring session definition is invoked.

By providing a defined API to the splitter functionality, third parties may implement useful applications and extended functions to operate on the system. In addition, by including logic to cooperate with agent technology (e.g., on file server 280), the system may work with "open systems" and file systems of disparate operating systems. In this fashion, the system may effectively blend or merge storage in disparate file systems and from disparate environments.

Figure 5:
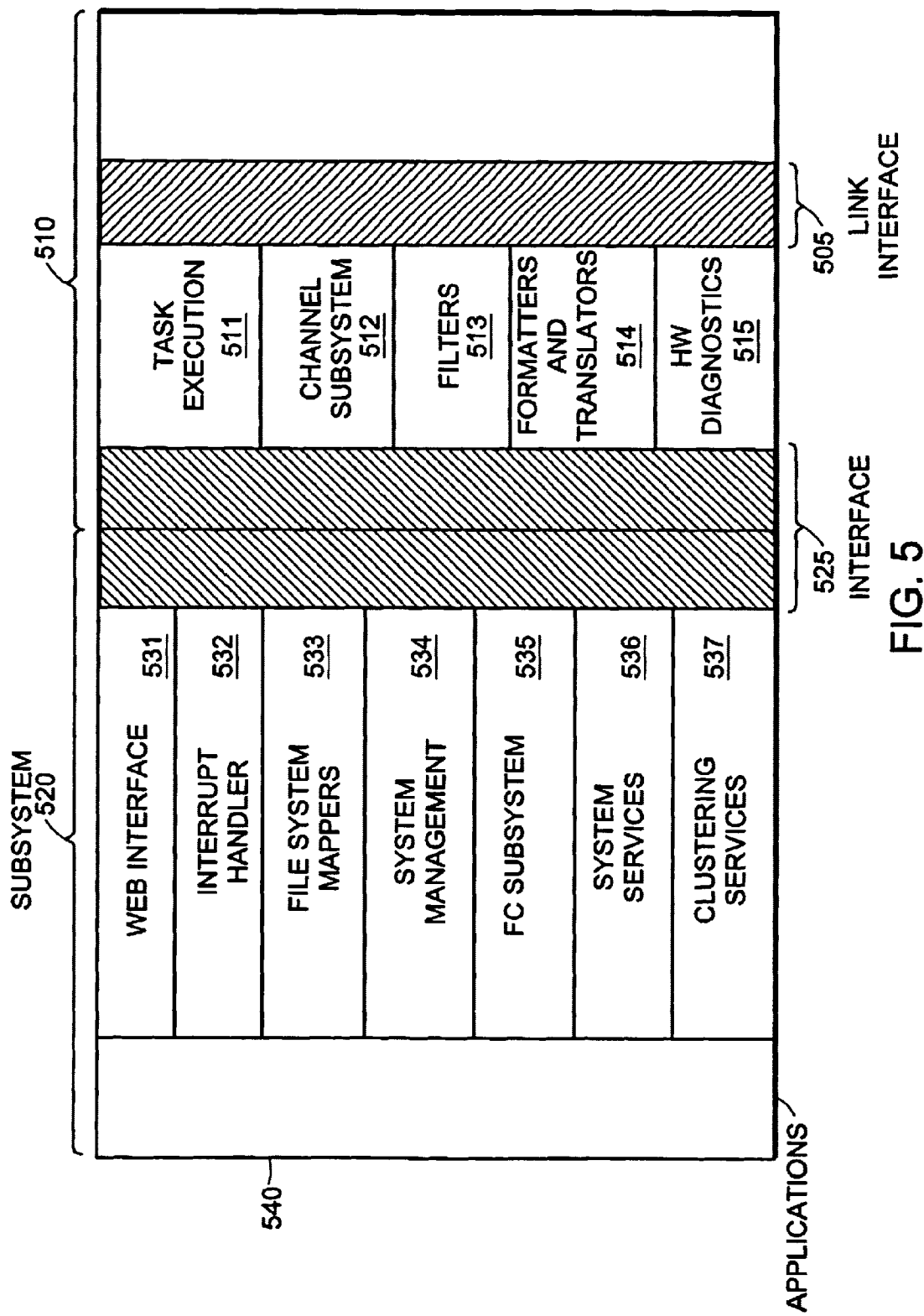
FIG. 5 shows a software architecture according to a preferred embodiment of the invention.

FIG. 5 shows a more detailed diagram explaining the software architecture. It includes a link interface 505, an intelligent splitter subsystem 510, a host/splitter interface 525, and a host system 520. It also includes a web server subsystem and an agent module subsystem (not shown).

Splitter/Port (or Link) Interface

The splitter/Port interface software 505 controls the link hardware (i.e., the Ports) of the splitter 200 and is used by the splitter subsystem 510, described below. This interface is used for the transmission and reception of frames on splitter Ports. The link interface implements interrupt service routines (ISRs) and cooperating software to respond to and handle interrupts from the Ports. The ISRs either process the interrupt internally (when a small amount of processing time is needed), or post requests and parameters on a system queue for later execution under the control of the task execution component 511, explained below.

In one embodiment, data transmission of frames operates according to one of two transmission modes: (1) data is transmitted on one Port, and (2) data is transmitted on two Ports. To implement these modes, link interface routine(s) may be used to set the appropriate state in the transmit logic to point to data to be transmitted and to set the appropriate start bits. As described above, this will cause the transmit logic to read data from buffer 220 and transmit it on appropriate Ports. The actual data sent will depend on the application state; e.g., it could be a received frame, an altered version of a received frame, or I/O stream data that was created by the splitter and host, as explained below. In one embodiment, the link interface 505 includes an ISR and/or cooperating software to respond to interrupts indicating that a transmission has been completed (see splitter description for how this interrupt is sent). This software may then perform various memory management functions to monitor the free, usable space within buffer 220. For example, such an interrupt may indicate that the space in buffer 220 that held the data just transmitted may now be used for other purposes. The link interface includes ISR(s) and routine(s) to handle any transmission errors generated during a transmission.

In a preferred embodiment, the link interface 505 uses the hardware's ability to distinguish between the reception of non-data frames and data frames into the splitter 200. This distinction may be exploited to make the software operate more efficiently and to coordinate the reception and transmission processes.

When a non-data frame is received, a Port creates and sends a corresponding interrupt to processor 230, which causes a corresponding ISR and other link interface software to be invoked. Thus, for example, if frames for a command phase of an I/O stream are received by the splitter, this software will be invoked. Likewise, this software is triggered by a status frame, a command received frame, and the like. The link interface reception software may then analyze the received frame data (e.g., by indexing to specific bits) to determine the precise control information conveyed by a mainframe, control unit, director, or the like. This might be useful to track the state and status of CCWs or CCW chains or to implement specific features of extended functions. For example, this might be used to verify that an acknowledgment frame is being returned in response to a command frame and to analyze the contents of the acknowledgement. In addition, it might be used to implement a caching function, for example, by analyzing a write address to determine if it hits information cached in memory of host 260.

When a data frame is received, a Port may create and send a corresponding interrupt to processor 230, though not necessarily. More specifically, in one embodiment, Ports generate an interrupt when a first data frame of an exchange is received but not subsequently for that data exchange. This interrupt, similarly to that described above, causes an ISR and cooperating software to be invoked to handle the first data frame event. Since each frame of an exchange may be handled identically, there may be no need to distinguish between the multiple data frames of an exchange or to handle the multiple frames individually as events.

Link interface software may respond to this first data frame event in several ways. For example, the software may use this event to initialize transmit logic on specific Ports as called for by the application (more below) so that the transmit logic may be subsequently triggered into action to transmit frame data(for example, after an interrupt is received indicating that a specific amount of frame information has been received by a Port). Alternatively, the link interface software may both initialize the transmit logic and trigger it, if a first frame of received data is determined to be sufficient to start a transmit process.

As alluded to above, before a data frame is received, the software has already received. non-data frames, and thus has had an opportunity to obtain information about the data frames and exchanges to be received subsequently. For example, a write command frame, a corresponding write command acknowledgment frame, and a data request frame each may convey useful information about a subsequent exchange of data frames. From this type of information, the software can determine what actions should be taken (more below) and can determine whether particular data transfer modes may be appropriate.

In one embodiment, before data frames actually arrive at the splitter, the software has set state in the splitter Ports to correspond to one of three data transfer modes. In a first mode, Port state may be set so that data frames are received only in the splitter's buffer 220. This might be useful for functions and applications in which the data needs to be translated, filtered or formatted before being transmitted on a Port. To implement this mode, the software may initialize the receive logic of the receiving Port for the reception of data frames. The data will then be received in the buffer segment corresponding to the receive Port, and the software will copy and modify information as appropriate before sending it out on a transmit Port under the control of software, for example, from the software on host 260 (more below). In a second mode, Port state may be set so that frame data is received in the splitter's buffer 220 and also subsequently sent on a Port. This might be useful when a control unit is to receive an unmodified version of a data stream. A modified version of the frame data may be created from the received frame and sent subsequently to a different Port, similarly to that described for the first mode. For example, this mode may be useful in the mirroring example discussed above, in which a primary control unit received an unmodified stream, and a mirroring control unit received a stream that had been altered. To implement this mode, the software may initialize the receive logic of the receiving Port as explained above to receive data, and it may initialize the transmit logic in another Port so that Port is ready to start transmission of data. In a third mode, Port state may be set so that data frames are received in the splitter's buffer 220 and also subsequently sent on two outgoing splitter Ports. This might be useful when two control units are to receive an unmodified version of a data stream, e.g., a mirroring example in which the data frames are unaltered. The software would operate similarly to that for the second mode, but would initialize the transmit logic for two splitter Ports, as opposed to one.

In any of the above modes, the receive logic may be initialized to generate an interrupt once a portion of the whole exchange is received (a data breakpoint). For example, this may be useful in the second and third data modes to implement a form of data streaming that reduces data latency in the buffer 220. By initializing the Port states with a data breakpoint, once the software receives a breakpoint interrupt, the software may then begin transmission of the data frames on the other Port(s) by setting appropriate "start bits" in the transmit Ports, even though the entire frame or exchange to be transmitted is not yet fully received in the buffer 220 from the receiving Port(s). Data streaming like this works because the receive logic and transmit logic both operate at protocol defined speeds. Thus, the transmit logic is assured of always reading valid data from the buffer 220. As outlined above, the software may initiate data streaming after a first data frame is received, or the software may be configured so that data streaming is initiated only after a specified amount of information has been received. Data streaming is advantageous in certain situations where the data to be transmitted is identical to data received (see, e.g., mirroring application discussed above).

The software also provides an ISR to respond to an interrupt generated when an entire exchange has been received. This might be useful when an entire exchange needs to be modified or processed in some way.

Intelligent Splitter Subsystem

The intelligent splitter subsystem software 510 runs on each intelligent splitter 200. In one embodiment, the intelligent splitter subsystem 510 runs under the VxWorks real-time, operating system, which is responsible for providing known, basic system services for the subsystem 510. The prime functionality of subsystem 510 is to provide data and control access to mainframe storage and other devices connected to one of the Ports of a splitter device 200. This subsystem primarily operates at a physical level. It includes a task execution component 511, a channel component 512, a filter subsystem 513, a formatter and translator subsystem 514, and a diagnostic subsystem 515.

The task execution component 511 is responsible for executing the logic of the splitter subsystem 510. All the other components implement service routines that are invoked by the task execution component 511.

Task Configuration and Execution

The task execution component logic 511 is triggered by one of the following events: (1) a service request from the host 260 through the host/splitter interface 525, described below (2) indirectly as a result of an interrupt from a splitter Port, processed by the Link interface (in this situation, the ISRs are foreground components, and the task execution component is a background component); and (3) timer interrupts.

As outlined above, the splitter is first configured through a host 260 to define sessions, which associate prescribed physical address domains with certain actions that should be taken by the splitter software for I/O streams falling within the domain. More specifically, a session definition is established with multiple messages sent via the host/splitter interface 525. One message updates internal data structures in splitter memory 240 to define the subject of the extended function at issue. The data structure includes information about (a) the control unit address (b) the device address, and (c) the set of tracks for which the extended function is to be performed (for ESCON embodiments, or a set of blocks for a SCSI embodiment). This information may be stored in splitter data structures and later used by the software to determine whether an I/O stream received by the splitter falls into a registered domain. The host 260 also sends a message to the intelligent splitter 200 that identifies the logic to execute for the specific subject. In one embodiment, the following terms define the logic to execute:

1. The target(s) for data is specified (for the case of data redirections or data duplication). Targets can be another mainframe disk location; a host memory 264; splitter memory 220; or an open system disk.

2. The transformations and the reformatting to be performed on the data for each data transfer are specified. These refer to "formatters and translators" routines within the formatter and translator subsystem 514 to be applied on the data. In addition, the order of application of these routines is specified.

3. Patterns within the data stream to be detected by the filter subsystem 513 that should trigger a notification to the host are specified.

4. The conditions under which task execution component 510 has to notify the host 260 of its execution state are notified. These include notify and wait and notify and continue operations.

The session definition also includes host breakpoint information that identifies a trigger condition or a specific sequence of events that activate the breakpoint. The breakpoint information also identifies what action should be triggered when the breakpoint is detected; e.g., notify the host 260 and continue, or notify the host 260 and wait for a reply. The session definition also includes context information, which links to a process running on the host 260 that initiated the defined session.

Thus, using the above types of message, extended functions may be implemented as a defined domain and ordered list of operations and targets for an I/O stream. The action list of operations defined is a session definition is treated as a pipe; that is, the input to the entire action list is the entire data range. Some of the session definition components may imply further processing. For example, specifying an open systems disk may imply processing to send the information to a particular fibre channel target, and would imply various forms of negotiation and processing to send the data.

After the splitter has been configured with session definitions (potentially for many domains of interest) it is ready to start intercepting I/O streams and taking defined action in response to interrupts from the Ports. When the task execution component 511 is invoked by the splitter Port, e.g., via Port interrupts to the link interface, the task execution component 511 consults session definition data structures to determine whether the received frame information corresponds to a registered session definition and if so it performs the actions defined in the session definition. The specified actions can refer to translation and reformatting operations and filters provided by splitter components described below.

Session definitions may be created and used in response to operator commands or the like. These commands may be communicated via a console 270 (see, e.g., FIG. 2A).

Channel Component

The channel component 512 implements logic to send CCWs or chains out one of the splitter Ports. In short, this component mimics the operations that might otherwise result from a mainframe host or a control unit (i.e., issuing a CCW chain). The channel component 512 includes logic for interacting with a host 260 which initiates this component via a corresponding API (described below) that sends "service requests." It also includes logic for implementing the state machine corresponding to a CCW or chain, and for complying with the ESCON protocol for a channel as defined in the standard, to send such CCWs.

More specifically, the host 260 may send a message over the bus 268 using interface 525 to request that the splitter 200 perform additional data transfers and operations. The message specifies a service storage domain, for example, identifying the storage area on which the service is to operate. The storage area is defined in physical terms: for a particular device, a set of extents for ESCON or a set of blocks for SCSI. The messages also specify the direction of the transfer, the subject of the transfer, and the location of the data within buffer 220 from where, or to where, the data should be transferred. The service request also includes data processing information. Like the case of a session definition, the data processing information defines the processing that the splitter should perform on the data prior to the data being routed to the target. This information is in the form of an ordered list of data filters, transformation and translations that the splitter implements. The service request also includes breakpoint and context information analogous to that of the session definition. In this case, the task execution component 510 is invoked by a "service request" from the host 260 which specifies the above. For example, the host may make a service request to the splitter to cause the splitter to read a set of tracks from a device into memory. In processing the service request, the software may create the necessary CCW frames (both header and payload of various types) in a buffer segment associated with processor 230 and then transmit those frames over the specified port.

Service requests may be created and used in response to operator commands or the like. These commands may be communicated via a console 270 (see, e.g., FIG. 2A).

Filters

The filter subsystem component 513 provides capabilities for inspecting the content of data flowing through the intelligent splitter 200 and for testing whether prescribed patterns exist within the data. The routines provided by this component may be referred to in session at definitions or service requests. The patterns to be tested are defined by the host and communicated to the software executing on the splitter 200 through the host/splitter interface 525. When a pattern is detected the splitter software, a notifying message is sent to the host 260 and action may be taken. For example, a filter may remove a specified pattern from a data stream. Filters that may be used include those found in data mining and database technologies, though the architecture permits the specification of new filters.

Formatter and Translator

Analogously to filters, the formatter and translator component 514 provides formatter and translator routines that may be referred to in session definitions or service requests. For example, a formatter may include logic to format blocks of one size to another, and a translator may translate data from one form (e.g., EBCDIC) to another (e.g., ASCII). Akin to situation with filters, the formatters and translators used may include those found in data mining and database technologies, though the architecture permits the specification of new formatters and translators. This functionality might be used at higher levels of abstraction as well, for example, by utilizing metadata from a file system to reformat database records.

Diagnostics

The diagnostic subsystem 515 is responsible for executing test programs.

Host/Splitter Interface

Host/splitter interface software 525 defines a mechanism for transferring data and control between the host 260 and a splitter 200. The interface software 525 facilitates the control of the splitter's work, shares information between the splitter 200 and the host 260, synchronizes content of corresponding data structures across host/splitter boundaries, and synchronizes execution flow between the tasks executing on a host and the tasks executing on a splitter. Among other things, this interface helps the host 260 configure a splitter 200 and request services from the splitter.

In one embodiment, interface 525 uses messages to provide communication between the host and a splitter. Messages are sent over the bus 268 by a PCI bus driver, and the splitter and host communicate according to a defined splitter interface API.

PCI Driver

The PCI driver manages a physical communication layer corresponding to the bus 268, e.g., a PCI bus. (The term PCI driver is used herein to refer to a preferred implementation for bus 268, though the invention is broadly applicable to other arrangements including other bus architectures.) The driver implements general message passing between the host 260 and the splitter 200 over the bus 268. In one embodiment, the data transfer mechanism between the host 260 and the splitter is asymmetrical. This provides one way to help avoid deadlock. All intra-platform message buffers (i.e., messages between the host and splitter) are maintained only in the splitter's processor memory 240 as two circular message buffers. One buffer is for incoming messages (to the splitter from the host), and the other is for outgoing messages (from the splitter). In the latter case, the host will cause a copy of the message to be made in the host's memory 264. Only the host directly accesses the splitter memory 240. The splitter 200 never accesses the host memory 264. That is, only the host will initiate DMA transfers between the host and splitter, though the host will instruct the splitter to do the DMA on the host's behalf.

Depending on the data transfer length and the destination of the data transfer, the PCI driver implements one of the following transfer methods. For small payloads (i.e., less than 128 bytes) mailbox messages are used. In this case, it is assumed that the data constitutes a message and not data for populating a particular data structure. The data will be directed to the next available circular buffer. For data longer than 128 bytes, it as assumed that the data populates a particular data structure. In this case the DMA mechanism will be used, and the data will be "DMA" ed directly to the data structure in question.

The PCI driver interface is defined with the following functions:

1. PCpciSendMessage ( ): This function loads the next free circular incoming buffer and triggers a mailbox interrupt on the splitter. This function returns control after generating a mailbox interrupt to the other side.
2. ESpciSendMessage ( ): This function loads the next free circular outgoing buffer and triggers a mailbox interrupt on the host side. This function returns control after generating a mailbox interrupt to the other side.
3. ESpciFreeMessage ( ): This routine marks a message buffer as free. This function returns control right away after initiating the DMA operation.
4. ESpciDMARead ( ): This function DMAs data to the splitter from the host using the splitter's DMA mechanism 266. This function returns control right away after initiating the DMA operation.
5. ESpciDMAWrite ( ): This function DMAs data from the splitter to the host using the splitter's DMA mechanism 266.
6. ESpciMessageReceived ( ): a mailbox ISR invoked on the splitter 200. The routine will invoke task execution component to process a received message.
7. PCpciMessageReceived ( ): a mailbox ISR invoked on the host 260. When this function returns control, the software may assume that the message buffer has been freed, i.e., that the host has already copied the message to its memory as outlined above.
8. ESpciDMAcomplete ( ): a DMA ISR called when the DMA operation completes. This routine will either wake the task that initiated the DMA operation (for synchronous operations), or invoke a callback routine defined by the invoking task (for asynchronous operation).

The driver maintains the buffer pointers (next free buffer and next available message). DMA operation is executed explicitly or implicitly only on the host's request. It will be executed implicitly by sending a message using PCpciSendMessag requesting data transfer from a specific location in one address space (host/splitter card) to a specific location in another address space. It will be executed implicitly as part of an operation requested by some other message type (execute CCW chain for example). In any case the splitter may assume that, whenever it does DMA to/from memory locations in the host 260, it has exclusive access to these memory locations.

Splitter Interface API

The splitter interface API defines the interface through which applications access the functionality provided by the splitter 200 and splitter subsystem 510. (By defining such an API, third party developers may create applications and functions for the system.) From the application's perspective, the splitter provides the functionality defined by splitter interface API, and all of the lower-level splitter details are hidden from the application's view.

The basic method of interaction using this interface is as follows. The host software uses routines from the API to communicate with the splitter. The routine sends a corresponding message to a relevant splitter using the PCpciSendMessage routine of the bus driver interface. This routine passes the host's request along with the necessary, corresponding parameters to the splitter. Each request has a corresponding type and message format understood by the software. When the splitter 200 completes the processing of the request, the splitter 200 sends a message back with the completion status and possibly with additional data to satisfy the request. Some API routines execute synchronously, meaning that the host routine making the call blocks from further execution until a reply message is received from the splitter. Some API routines operate asynchronously (i.e., non-blocking). In one embodiment, asynchronous routines operate in conjunction with a callback routine that should be invoked when a response message eventually arrives from the splitter.

The interface API may be categorized based on the functionality the routines provide. For example, one embodiment provides an API having routines for (1) defining sessions; (2) service requests; (3) breakpoint/notification requests; (4) querying and setting the current state of a splitter; (5) receiving and/or sending data update requests; and (6) resources allocation requests.

Session Definition: These API routines are used to establish session definitions in the splitter 200. As outlined above when describing the task execution component 511, a session definition defines a scope of data for which the splitter 200 has to execute some specified work.

In one embodiment, the API uses the following type of messages to establish session definitions on the splitter. A SessionStartMsg defines all the parameters of a session as specified above and activates the session. This message may be sent by the host 260. A SessionManageMsg execute management operations on an existing session task (e.g., query the session's state or cancel the session). A SessionStatusMsg reports status of an existing session, either a reply to SessionManageMsg, or as a result of some unrecoverable error state in the splitter.

Service Request: These API routines are used by the host to request a service. A service request is associated with a CCW or CCW chain of granularity. Under some embodiments, a host 260 may issues service requests corresponding to some CCWs of a chain to one splitter, and other service requests corresponding to other CCWs of the chain to another splitter. When a splitter finishes processing the service request it sends a completion notification message back to the host.

This API uses the following messages to implement service requests:

1. ChainsStartMsg: defines all the parameters of a service as defined above and starts its execution.
2. ChainsManageMsg: executes management operations on an existing service task (e.g., query the service's state or cancel the service).
3. ChainsStatusMsg: reports status of an existing service, either a reply to ChainManageMsg, or as a result of some unrecoverable error state in the adapter.
4. ChainContinueMsg: sends a particular frame type in a pending chain. For example, to keep a domain locked, an appropriate breakpoint is set for the domain-end, causing the adapter to delay the status-ACK frame of the last CCW in a domain until a ChainContinueMsg is received.

Breakpoint/notification request: These routines are used to establish breakpoints and to communicate associated notifications. This mechanism allows the splitter software and the host software to cooperate as a distributed application, to facilitate certain features like recovery procedures, and to support protocols having frame multiplexing. As outlined above, a breakpoint specifies conditions at which the splitter should inform the host of the breakpoint event. The splitter informs the host of such an event through a notification message. In one embodiment, there are two methods of defining and setting breakpoints/notification request in the splitter code. One method includes the information as part of a session definition or a service request. The other explicitly uses a breakpoint/notification request.

In one embodiment suitable for ESCON environments, breakpoints are classified into the following groups:

1. Chain events. These include Start of chain events, End of chain events, Start of domain events and End of domain events. These events help the software cooperatively track the state of chains of CCWs and the like.
2. Data related events. These include "data ready" events, indicating that a data read condition is satisfied, e.g., after a certain amount of data was received; "buffer free" events, indicating that a data write condition satisfied, e.g., after a certain amount of data was sent; "data transformation start" events sent just before beginning data processing as defined by the corresponding session/service; "data transformation end" event sent just after data ending data processing as defined by the corresponding session/service.
3. ESCON protocol related events. These include the following:

After ESCON CCW received
   Before ESCON CCW transmitted
   After ESCON Status received
   Before ESCON Status transmitted
   ESCON disconnection
   ESCON reconnection
   After ESCON frame received
   Before ESCON frame transmitted
   ESCON sense data 4. Data format update events. These indicate, for example, that the splitter read a track with previously unknown format
5. Error condition interrupts. These include task completion interrupt, ESCON link failure interrupt, general error condition interrupt, timeout interrupt, and shutdown interrupt.

The following messages are used in association with breakpoints and notifications:

1. BreakpointSetupMsg: adding, modifying or canceling a single breakpoint type for an existing session or chain task. Usually used as a response to a breakpoint, to set up the next breakpoint in the expected sequence of events.
2. DomainCheckMsg: breakpoint message from the adapter on a domain start. This requests information from the host regarding the relevance of the associated ESCON extent to any active sessions on this splitter.
3. TracksFormatMsg: used by the splitter to transfer ESCON track format information to the host's cache (after a Read-Track or a Format-Write), or as a host's reply to a breakpoint (e.g., DomainCheckMsg) to update the track-format cache on the splitter.
4. DomainStatusUpdateMsg: either a reply to DomainCheckMsg, or an update to information that is cached on the splitter, regarding the relevance of specific extents to the active sessions on the splitter.
5. BlocksMapMsg: used by the host to update the offsets of data in a buffer that is later transferred to a SCSI device (i.e., a partial information about ESCON-SCSI mapping). This is a reply to DomainCheckMsg
6. DisconnectionMsg: breakpoint message for a disconnection. Used by the splitter to transfer the status of the disconnected chain to the host, so it may be resumed on reconnection. Used by the host to transfer the same status to the splitter that receives a reconnection (or a negative response in case the reconnection is refused).
7. ReconnectionMsg: breakpoint message for a reconnection. The splitter requests a negative or positive reconnection reply from the host.
8. DataReadyMsg: breakpoint message from the splitter after the data is ready on it (i.e., the data was read from an ESCON device or received from a host), or a breakpoint reply from the host to the splitter after the data from a SCSI device or from the host was transferred to a buffer on the splitter.
9. BufferManageMsg: breakpoint reply from the host to assist in the buffer management on the splitter. Informs the splitter of what data was read by the host (or the SCSI card). Virtual buffer identifiers are used to mask the splitter's implementation details.

Query and set the current state of the splitter. The API for querying and setting the current state of the splitter sets various state variables on the splitter like putting splitter in debug mode, for example, or setting Port state in splitter software to indicate that the Port is offline.

Receive/send data update request: The API for receiving and sending data update requests. This is used to get an update, or send an update of some shared data, like update format track table, for example, or to inform a splitter of a control unit to which it is connected.

Allocation of resources request: The API for allocation of resources sends messages to allocate resource and facilitate resource management, e.g., avoid deadlocks. This may be used by the host to allocate and lock some splitter resources like a Port or buffer space on the splitter, needed for the execution of one of the host's tasks requested via a service request. This request is not exposed to the third party APIs, and is instead used internally by other request types.

Host Subsystem

As shown in FIG. 5, the host subsystem 520 includes a web interface component 531, an interrupt handler 532, file system mappers 533, system management 534, a Fibre Channel (FC) subsystem 535, system services 536, and clustering services 537. These components and services in turn may be used by host applications 540 and the other host components to implement data management applications and functions (e.g., mirroring, backup, caching, etc.).

The web interface component 531 provides an interface to a web server subsystem 270 that allows a web server to facilitate servicing, managing, and debugging of the system via a remote web-based console.

The interrupt handler 532 handles breakpoints and assists with their dispatching.

The file system mappers 533 include logic to map logical objects into their corresponding physical addresses. These physical addresses may then be used in the construction of session definitions and service requests. In one embodiment, the file system mappers cooperate with agents on other systems. For example an agent may execute on a file server 280 operating under another operating system (e.g., LINUX, NT, Solaris) and this other file server may be effectively merged into the system using the host 260. For example, the file mapper may cooperate with such agents to request physical and logical level information from such file servers (i.e., metadata) or to perform other operating system functions on the host behalf (e.g., open a file on the server). The host may use metadata to implement logical level functions and operations in conjunction with a splitter, e.g., mirroring on a logical level.

System management 534 is responsible for performing administrative functions, e.g., configuring the system, shutting down devices, and the like.

Fibre Channel (FC) subsystem 535 is responsible for communicating with components 290 over a fibre channel protocol.

System services 536 is responsible for providing and interfacing with operating system services.

Clustering services 537 is responsible for arranging hosts 260 and splitters into clustered arrangements to improve connectivity and reliability. (This clustering is not to be confused with mainframe-level clustering described below.) The types of connections supported are conventional. The services, among other things, provides software to synchronize and help keep coherent data structures among hosts 260. This includes managing a virtual memory space shared by potentially multiple hosts 260.

Applications 540 are data management applications and extended functions that may be used in the system. These include applications that may be developed by third parties. The applications use the functionality as defined in the host subsystem 520 and the splitter interface described above. That is, applications may be developed to use the defined API of the host, and the splitter, as described above.

At a high-level of abstraction, all applications 540 perform the following. Each application performs some application-specific tasks that may require the use of file mappers 533, system services 536 and the like. The applications cause the host 260 to send messages to the splitter 200 to define sessions and/or to request services. If the application needs to interact with software running on the splitter 200, the application software either directly or indirectly needs to establish breakpoint conditions in the splitter software logic, at which the host application desires to be notified. The host application may call a system service that will cause the application to block until an incoming breakpoint message is received for that application, and that will cause the application to unblock (or wake-up) upon reception of the message. The application may then access a corresponding buffer that includes status information and the like about the breakpoint. The application may then react (or "handle") the breakpoint in an application-specific way, for example, by "switching" on the breakpoint type information and calling an associated callback routine for the type. Once done with such handling, the application may then call the system service and block-until the next breakpoint.

A breakpoint handler/dispatcher helps control the invokation of applications and the like in response to messages passed back and forth between the host 260 and the splitter 200. This logic operates analogously to event engine techniques using registered callback routines. In this case, however, multiple applications may effectively register for a notification.

Exemplary Applications and Extended Functions

FIG. 3A illustrates a simple system 300 to illustrate certain basic applications and functions for which the system may be programmed using the principles of the invention. The system 300 includes intelligent splitter 200, a mainframe computer 310, two DASD control units 320, 330, and several communications links. More specifically, an ESCON port 312 of computer 310 is connected to Port A of intelligent splitter 200 via an ESCON communications link; an ESCON port 322 of control unit 320 is connected to Port B of intelligent splitter 200 via another ESCON communications link; and an ESCON port 332 of control unit 330 is connected to Port C of intelligent splitter 200 via another ESCON communications link.

One simple use of intelligent splitter 200 in network 300 is to provide "mirroring," in which specified physical data on one control unit (e.g., a volume maintained by a primary control unit 320) is maintained as a concurrent copy on control unit 330. For this application, intelligent splitter 200 is appropriately configured to detect relevant I/O stream information. This configuration may be performed with the assistance of a host as described above, but it need not be and thus host 260 is excluded from this figure to illustrate this possibility. (For example, all of the necessary code may exist in a local memory of splitter 200.) Once so configured, the splitter 200 monitors I/O streams from mainframe host and/or from primary control unit 320. The splitter software may then monitor command frames from computer 310 and/or command response frames from control unit 320 to effectively track and detect when writes are to occur to a volume of interest. When a write to the targeted area is detected, the splitter may send that command frame to the control unit 320, unmodified, via Port B. The splitter 200 will create a modfied version of that command frame to reflect a different physical address on control unit 330 that is dedicated to holding the mirrored data of interest and send the modified command on Port C. The splitter 200 may then monitor write command acknowledgment frames from the control units 320, 330 to ensure that each is capable of accepting the command, and to create or retransmit a write command acknowledgment frame to the mainframe 310. For example, in one embodiment of this application, the splitter. may simply analyze acknowledgment frames from both control units and relay the worst case status to the mainframe. Assuming that the control units can accept the write data, the splitter will send data requests to the mainframe 310 accordingly and subsequently receive data frames in response. These data frames are then sent by the splitter to the control units unmodified. All frames coming from the control units, e.g., data request and status, are monitored by the splitter, which then creates corresponding messages therefrom to send to the mainframe 310 or which simply retransmit the worst case command received from the control units. For example, if the status information received from the control units indicate that both control units completed the write command successfully, then intelligent splitter 200 reports successful status information back to mainframe computer 310. However, if the status information received from the control units indicates that one or both of the control units did not complete the command successfully, then intelligent splitter 200 may report an unsuccessful status back to the mainframe computer 310. At this point, the mainframe computer 310 would normally invoke its standard error recovery procedures to handle the unsuccessful writes. As an alternative, if one or both of the control units reported an unsuccessful status to intelligent splitter 200, intelligent splitter 200 could respond by requesting one or both of the control units to re-execute the write command.

The above example illustrates two powerful operations performed by intelligent splitter 200: (1) data replication and (2) header modification (or header manipulation). As stated above, every ESCON frame includes a header component and a data component. (This organization exists in other I/O protocols as well.) The header component identifies the sender of the frame as well as the intended recipient, or destination, of the frame (e.g., control unit and device number on the control unit). The data component includes the data that is being transmitted from the sender to the recipient of the frame. As an example, during the data transfer phase of a write command, the data component of a frame would include data that is being written from the sender (e.g., a mainframe computer) to the destination (e.g., a control unit). The combination of header modification and data replication allows intelligent splitter 200 to send received frames to more destination devices (or other destination devices) than were originally addressed by the sender. In addition, from the perspective of mainframe computer 310, intelligent splitter 200 may appear to be a control unit (i.e., computer 310 may communicate with intelligent splitter 200 in exactly the same fashion in which computer 310 would communicate with a control unit).

In some frames, the data component (also known as a payload) helps further define an eventual target of interest. For example, in a locate record command, the payload will specify a record address of eventual interest. By having visibility into this component and an ability to alter it, the splitter 200 may perform other functions such as extent relocation. This may be used in many ways. One possible way includes relocating critical sections from two devices to be contiguous on a third device.

From the perspective of control units 320, 330, intelligent splitter 200 may appear to be a host computer (i.e., control units 320, 330 may communicate with intelligent splitter 200 in exactly the same fashion in which the control units 320, 330 would communicate with a host computer). This feature of being able to communicate like a host computer or a control unit generally allows intelligent splitter 200 to be transparent to all devices to which it is connected.

For purposes of the above example, only write commands need to be executed by both control units to maintain the integrity of the mirrored data on control unit 330. All other commands (e.g., read commands to the data of interest) received from mainframe computer 310 may be executed only by primary control unit 320. In some situations, it may be desirable to send other commands to the control units (e.g., reads in the above case) so that the control state of the control units more accurately mirrors each other.

Alternatively, the splitter may be programmed to switch over read commands to the Port having the mirroring control unit, if the primary control:unit is non-responsive.

As a slight alternative to the above, control unit 330 may be a different type of control unit than primary unit 320 and may store data in a different format. In such case, instead of having the splitter 200 send unmodified versions of the data frames received from mainframe 310, the splitter 200 can reformat the data to the new format. In the embodiments described above, the frames would be received from the mainframe into buffer 220, where they would be read and retransmitted to primary control unit 320. The processor 230 would read the same data and reformat it as required and write the reformatted frame information into a buffer segment associated with the processor 230. Subsequently, the reformatted data may be transmitted to the mirroring control unit 330.

As another example of reformatting, the primary control unit 320 could store data to disks and the other control unit 330 may have tape storage. The splitter 200 could be caused to read data from the control unit 320 via Port B and to write a reformatted version thereof to Port C. In the embodiments described above, this could be implemented by the host 260 issuing service requests to the splitter to make the appropriate reads and writes. In addition, the host may help map logical to physical addresses and, in this regard, can cause the function (in this case "offline back-up") to be implemented at a logical level, e.g., a file. However, as suggested by FIG. 3A, the principles are generally applicable and do not necessarily need a host 260.

This alternative illustrates an important point. Under the principles of the invention, heterogeneous control units and devices may be included in a system and used in coordination to implement extended functions. In this example, two different types of control units were used for a form of extended function known as offline backup, but the principles are generally applicable to other functions. Once the system is configured (whether by use of session definitions or otherwise), the system performs the extended function without requiring any special commands to be sent over the link. This leads to another important point. Namely, under the principles of the invention, extended functions may be implemented even though the control units only received basic, standard commands that are part of the ESCON vocabulary. No special commands needed to be sent to the control units. Thus, the control units do not need the extra complexity and sophistication to implement the extended functions, and instead control units that only provide the basic vocabulary are satisfactory. Thus, less costly control units may be used. Moreover, the control units did not need to dedicate any ESCON ports (often an expensive resource) to implement any proprietary inter-control unit links to implement the function. Thus, the extended functions do not detrimentally impact storage system connectivity.

Alternatively, an application may be desired where the mirrored version of data should be translated (e.g., EBCDIC to ASCII) or where certain data patterns should be filtered out (e.g., pattern "FFFF"). In such cases, the splitter 200 may be caused to perform the appropriate translation or filtering of the data frames.

As a variation to the offline copying above (which off course need not involve disparate forms of control units or physical storage), the system may be operated so that a mainframe can access a control unit while intelligent splitter 200 is performing off line copying or back-up. For example, intelligent splitter 200 may receive a read command from computer 310 while intelligent splitter 200 is in the process of copying a segment of data from primary control unit 320 to backup control unit 330. Intelligent splitter 200 may then stall the process of copying data from primary control unit 320 to backup control unit 330 and service the command received from computer 310. After the command from computer 310 has been serviced, intelligent splitter 200 may then resume the operation of copying data from primary control unit 320 to backup control unit 330. In the above embodiments, the task execution component could prioritize the operations of handling online and offline transactions. The task execution component also has the capability to determine that one task has the necessary resources to perform its operation, and it can thus ensure that the online task is scheduled at an appropriate instant. For example, if intelligent splitter 200 is in the process of copying a very large segment of data from primary control unit 320 to backup control unit 330 (i.e., by issuing a long sequence of read and write commands), intelligent splitter 200 could service the command received from computer 310 immediately after completion of the current read-write cycle (i.e., after the write command is executed by backup control unit 330). Alternatively, intelligent splitter 200 could interrupt a read-write cycle to immediately service the command received from computer 310.

Another function that intelligent splitter 200 may perform while engaged in off line copying is intelligent execution of write commands received from computer 310. As an example, suppose that intelligent splitter 200 is engaged in copying all data from primary control unit 320 to backup control unit 330 (a volume level backup) when intelligent splitter 200 receives a write command from computer 310. Intelligent splitter 200 could cause both control units to execute the write command. Alternatively, intelligent splitter 200 could analyze the address range affected by the write command and (1) cause both control units to execute the write command if the address range affected by the write command has already been copied by intelligent splitter 200 from primary control unit 320 to backup control unit 330 or (2) cause only primary control unit 320 to execute the write command if the address range affected by the write command has not yet been copied by intelligent splitter 200 from primary control unit 320 to backup control unit 330.

As another example, intelligent splitter 200 may be programmed to move data from a first domain on a storage to another domain on the storage (e.g., to perform extent relocation). In addition, the splitter may be programmed to redirect subsequent writes to the first domain to the new domain.

Another useful application that may be performed by intelligent splitter 200 is "data flow monitoring" and statistics gathering. Intelligent splitter 200 may be programmed to gather statistics during processing. Alternatively, for arrangements having a host 260, the splitter and host may be programmed to cooperate so that every time one of the intelligent splitter's Ports writes command frames into the buffer 220 the splitter notifies the host 260 accordingly. This notification is received by the host which dispatches to a corresponding statistics routine which causes the information from buffer 220 to be sent via bus 268 to host memory 264, where it may be analyzed to generate various statistics about usage.

Another function that may be performed by the system is caching either at a physical or logical level, or in an application-specific manner. For example, the host may create session definitions in which write data is stored in host memory 264 only for very specific portions of data defined in physical or logical terms, e.g., a frequently accessed index file of a file system. Subsequent commands may be intercepted and tested for hits to this cache. Likewise, caching algorithms may be implemented that utilize gathered statistical information.

Other applications that may be implemented on the system include data replication, volume remapping, extent relocation, prefetech algorithms, caching, data reformatting and/or translation, statistic packages, and security application (e.g., firewall-like applications to storage). In addition, the system may be programmed to perform fail-over or switchover functions. For example, the system may be programmed to detect or determine when a control unit has gone offline and in response thereto automatically route commands to a backup control unit. Alternatively, in some cases, it may be preferable to automatically send commands to both control units (i.e., without a switchover condition previously being detected) and to switchover dynamically if the primary unit fails to respond.

FIG. 3B illustrates another illustrative system 350. In system 350, both of the computers 360, 364 can read data from, or write data to, control unit 370. In general, when Port A of intelligent splitter 200 receives a command from computer 360, the intelligent splitter 200 will send a copy of that command via Port B to control unit 370; and the intelligent splitter 200 will send a copy of any data received from control unit 370 via Port B in response to that command via Port A to computer 360. Similarly, in general, when Port C of intelligent splitter 200 receives a command from computer 364, the intelligent splitter 200 will send a copy of that command via Port B to control unit 370; and the intelligent splitter 200 will send a copy of any data received from control unit 370 via Port B in response to that command via Port C to computer 364. This arrangement allows two computers to share a control unit.

To prevent the two computers from attempting to simultaneously use the same resource (i.e., the control unit 370) and potentially corrupt state or cause a deadlock, the splitter 200 can be programmed to control access to the critical resource (i.e., unit 370) using various forms of arbitration and scheduling techniques (e.g., using semaphores or analogous mechanisms). For example, if computer 360 transmits a command intended for control unit 370 to intelligent splitter 200 while control unit 370 is busy processing a command previously received from computer 364 to the same critical resource, intelligent splitter 200 may respond to the command received from computer 360 in at least three fashions. First, intelligent splitter 200 may simply report an unsuccessful status back to computer 360. Second, intelligent splitter 200 may wait until control unit 370 completes processing of the command previously sent by computer 364 before sending the command received from computer 360 to control unit 370. Third, intelligent splitter 200 may interrupt the control unit 370, report an unsuccessful status to computer 364, and may immediately send the command received from computer 360 to control unit 370 for immediate processing. It will be appreciated that intelligent splitter 200 may arbitrate between the two computers 360, 364 in numerous other ways.

Figure 6:
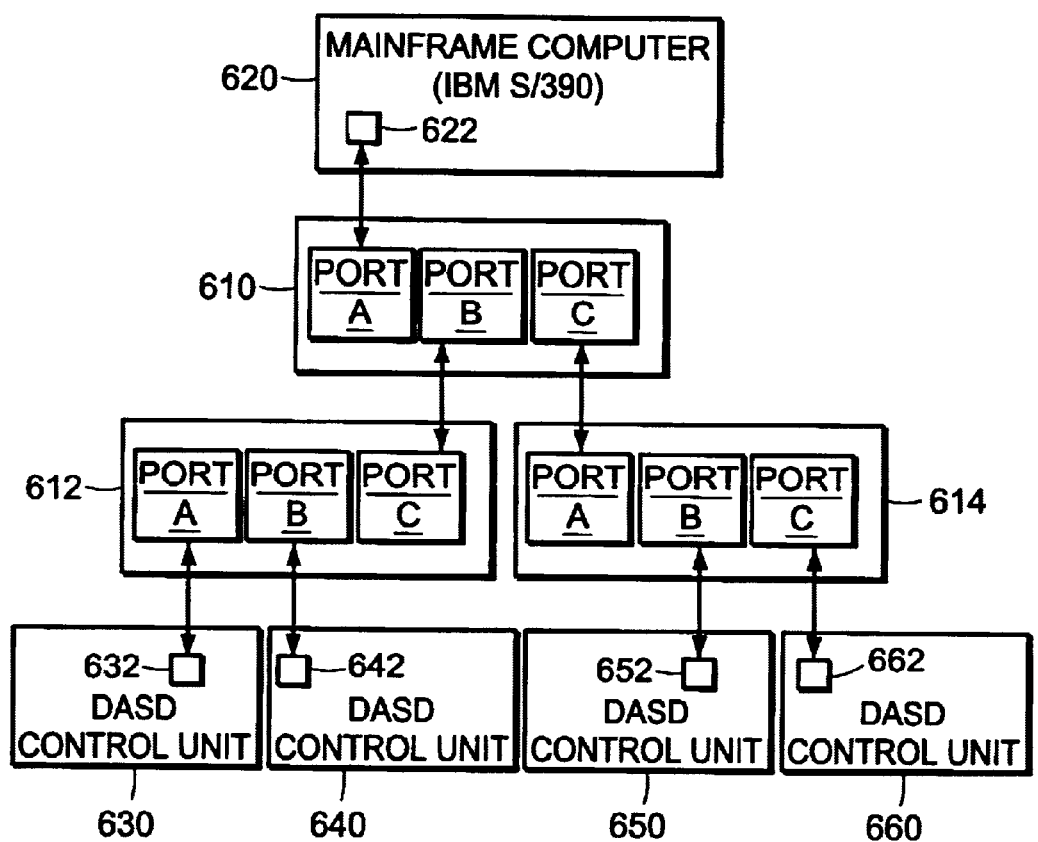
FIGS. 6–8 show an exemplary system architecture according to a preferred embodiment of the invention.

FIG. 6 shows an exemplary system 600 having multiple splitters operating cooperatively. In the illustrated arrangement, three intelligent splitters 610, 612, 614 are arranged with a mainframe computer 620 and four DASD control units 630, 640, 650, 660. In system 600, a port 622 of computer 620 is connected to Port A of intelligent splitter 610 via a communications link; Port B of intelligent splitter 610 is connected to Port C of intelligent splitter 612 via a communications link; Port C of intelligent splitter 610 is connected to Port A of intelligent splitter 614 via a communications link; Port A of intelligent splitter 612 is connected to a port 632 of control unit 630 via a communications link; Port B of intelligent splitter 612 is connected to a port 642 of control unit 640 via a communications link; Port B of intelligent splitter 614 is connected to a port 652 of control unit 650 via a communications link; and Port C of intelligent splitter 614 is connected to a port 662 of control unit 660 via a communications link. One function that may be performed on such an arrangement is n-way mirroring. Control unit 630 may be treated as a primary control unit and control units 640, 650, and 660 may all be treated as mirror copies of all or a portion of the data written to the primary control unit 630.

Figure 7:
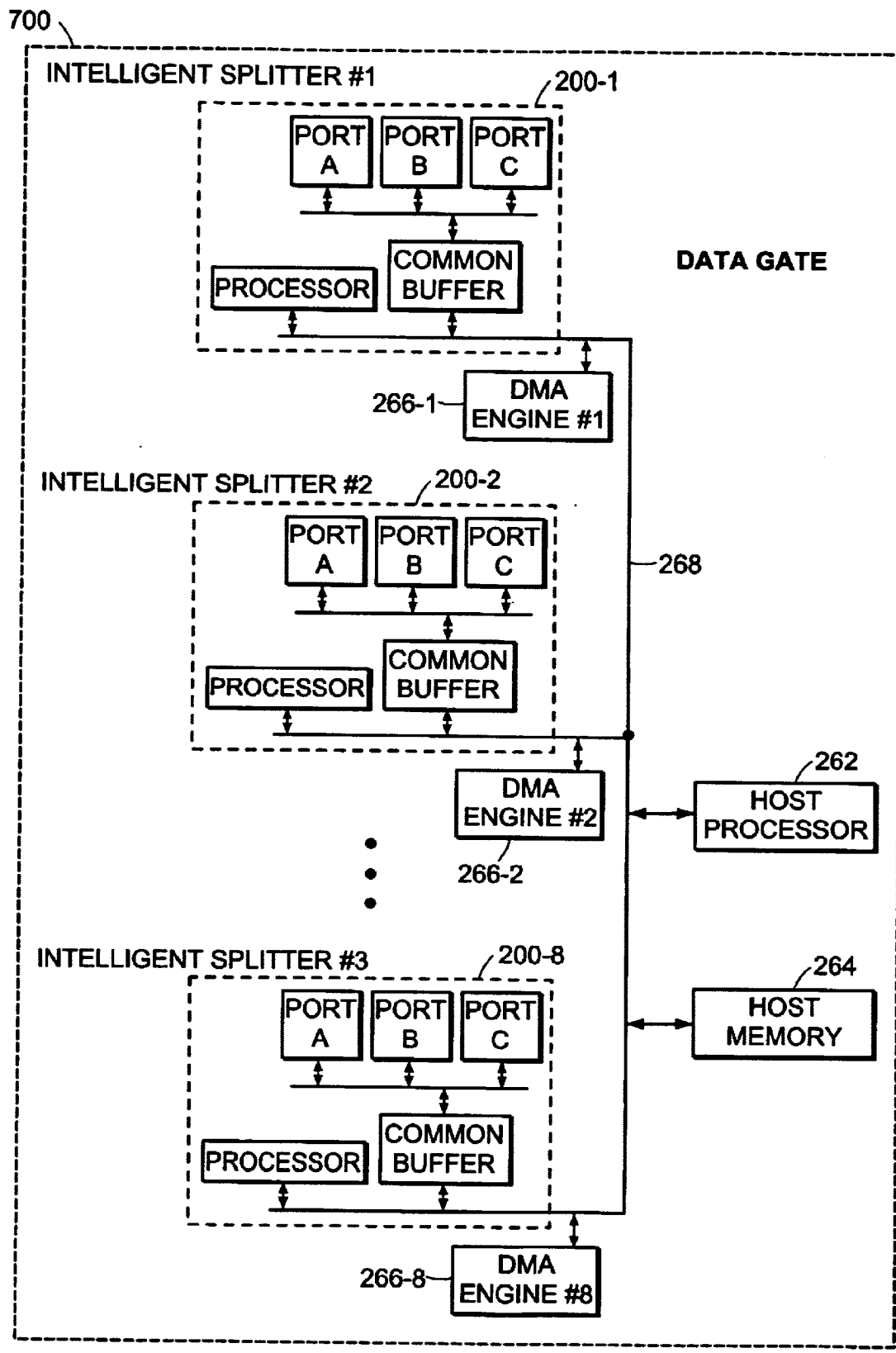

FIG. 7 shows a block diagram of an exemplary embodiment illustrating that multiple splitters may share a host 260. More specifically, system 700 includes eight intelligent splitters (200-1 through 200-8) which each communicate to host 260 via bus 268, associated bridging components (represented by DMA engines 266), and associated software. In one embodiment, each intelligent splitter is implemented on a single card and all cards are mounted in a personal computer chassis. System 700 may be referred to as a "data gate." Any network including one or more intelligent. splitters may implement the intelligent splitters as stand alone devices or by using a device like the data gate which includes a plurality of intelligent splitters. For example, one or more of the intelligent splitters in the data gate may be used to implement the systems discussed above (e.g., systems 300, 500, and 600 as discussed in connection with FIGS. 3, 5, and 6).

Figure 8:
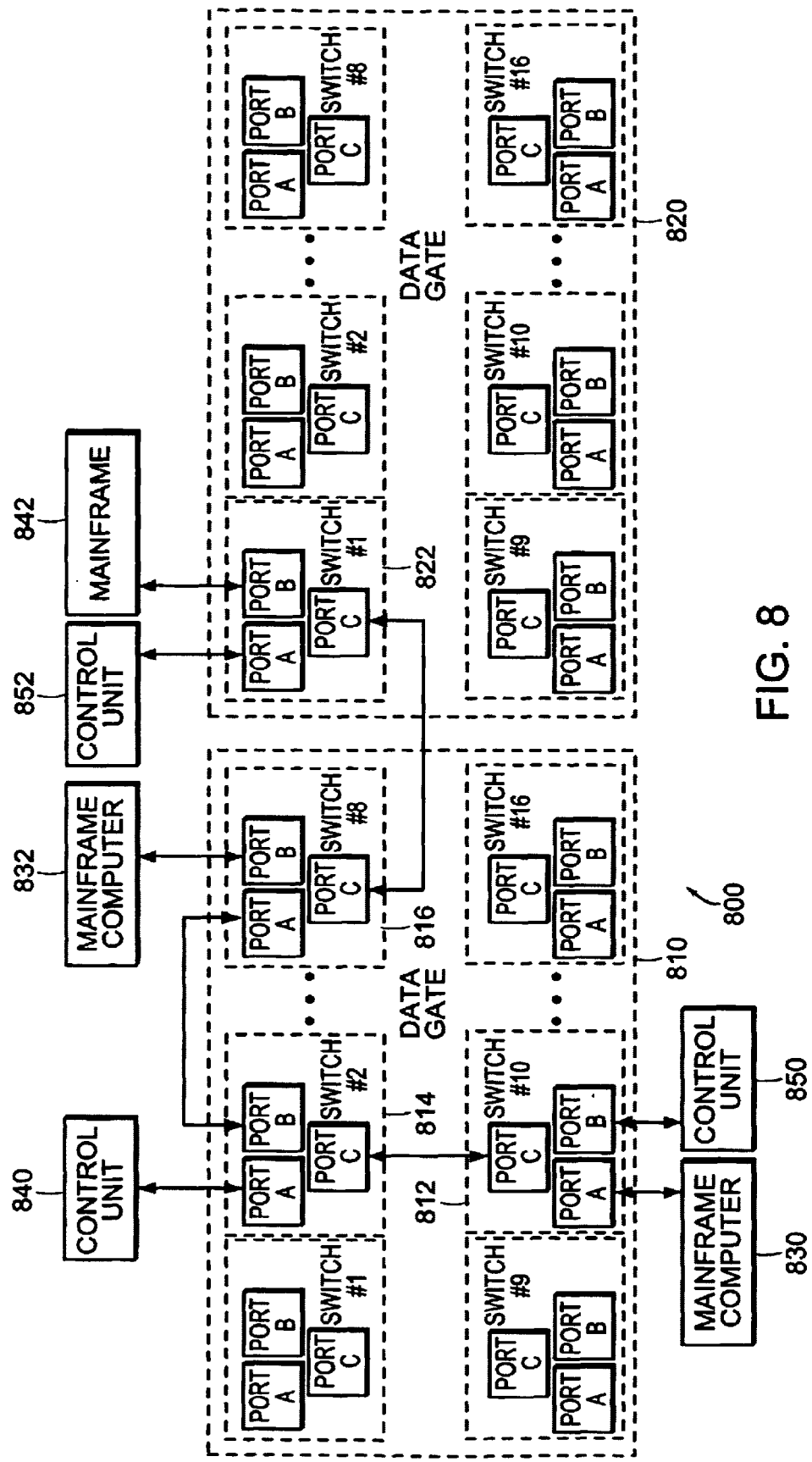

To illustrate the flexible connectivity possible, FIG. 8 shows a system 800 in which multiple data gates are used.

Referring back to FIG. 2A, that system shows how an intelligent splitter 200 may be integrated with other fibre channel systems 290 and with open systems components 270. For example, the splitter 200 may send data to the host 260, which has been read from a control unit 320. The host 260 may then cause that data to be transferred over a fibre channel FC to a file system 270. Likewise, the host 260 may cooperate with an open systems filer server 280 through agent technology at the server 280 and integrate the open systems server 280 into the overall system. For example, the host 260 may send commands via a TCP network link to server 280, asking the server 280 to open and allocate a file on server 280. Subsequently, the host may receive data from the splitter 200 which is then written to such a file. In addition, the host 260 and server 280 may communicate metadata about the file system served by server 280, and this data may be used by the host to perform logical to physical mappings to implement logical level functions and applications.

Clustering

Another useful function that may be performed with intelligent splitters is clustering. With clustering, mainframe computers may cooperate to perform an application specific task in a more reliable way. For example, one mainframe may be responsible for performing a portion of a distributed task, and a second mainframe may be responsible for performing another portion of the task. If one of the mainframes fails, the other does the work of both, preferably as seemlessly as possible. To do this, the clustering applications need to share various forms of data, including application-specific data and data to control the access of such data and to indicate the operational status of various components (more below).

Figure 9:
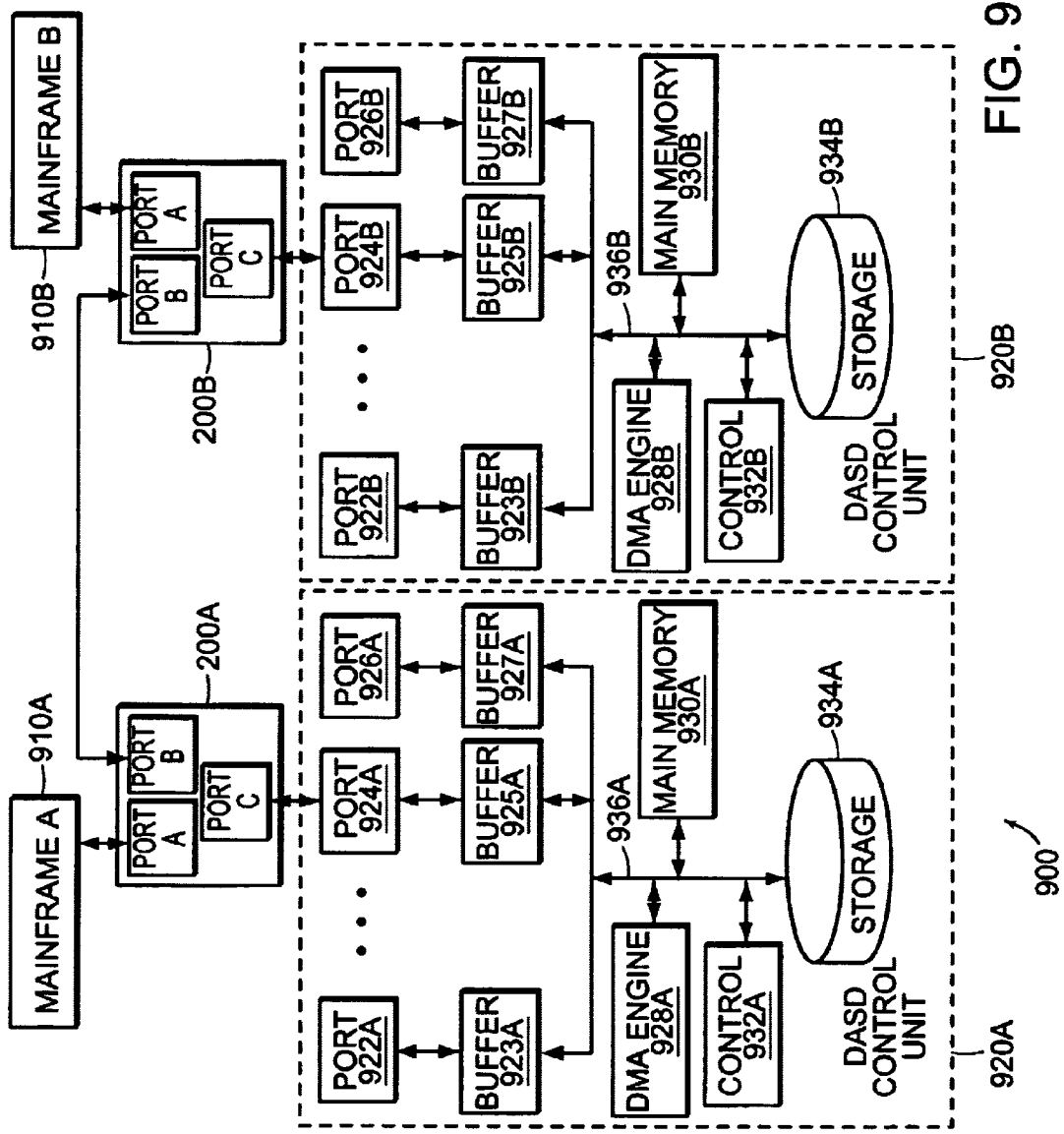
FIGS. 9–10 show an exemplary system architecture according to a preferred embodiment of the invention particularly suitable for clustering.

FIG. 9 shows one clustering arrangement 900 under a preferred embodiment of the invention. Two intelligent splitters 200A, 200B are arranged with two mainframe host computers 910A, 910B ("mainframes") and DASD control units 920A, 920B. In system 900, an ESCON port (not shown) of mainframe 910A is coupled to Port A of intelligent splitter 200A via an ESCON communications link; an ESCON port (not shown) of mainframe computer 910B is coupled to Port A of intelligent splitter 200B via an ESCON communications link; Port C of intelligent splitter 200A is coupled to an ESCON port 924A of control unit 920A via an ESCON communications link; Port C of intelligent splitter 200B is coupled to. an ESCON port 924B of control unit 920B via an ESCON communications link; and Port B of intelligent splitter 200A is coupled to Port B of intelligent splitter 200B via an ESCON communications link.

For the clustering application, the intelligent splitters 200A, 200B are programmed to transmit all transactions from their respective mainframes 910A, 910B to their respective control units 920A, 920B. A subset of the transactions is caused to be transmitted to the other intelligent splitter. The transmitted data corresponds to the data to be shared with the other processor. This includes the application-specific data needed to implement collaboration by the processors; for example the data that a mainframe will need to access if it becomes the only processor to perform the clustered task, if the other mainframe goes offline or becomes inoperative. It also includes control data to ensure that the application specific data is synchronized as necessary. It also includes status data, indicating for example whether a given control unit has gone offline. To transmit such data a private link connecting the two Port Bs is used in this embodiment.

When the data is received by the other intelligent splitter, it may then be cached in a host memory 264 (not shown in FIG. 9), where it may be accessed by the other mainframe. The arrangement allows data processing operations to be performed on the data to be transmitted to the other splitter, akin to the processing that may be specified in session definitions and service requests, and thus allows clustering in heterogeneous systems. In addition, the clustering may be implemented at a logical level, and allows the shared data to be transmitted more quickly, i.e., before it is written to storage in the primary unit.

Figure 10:
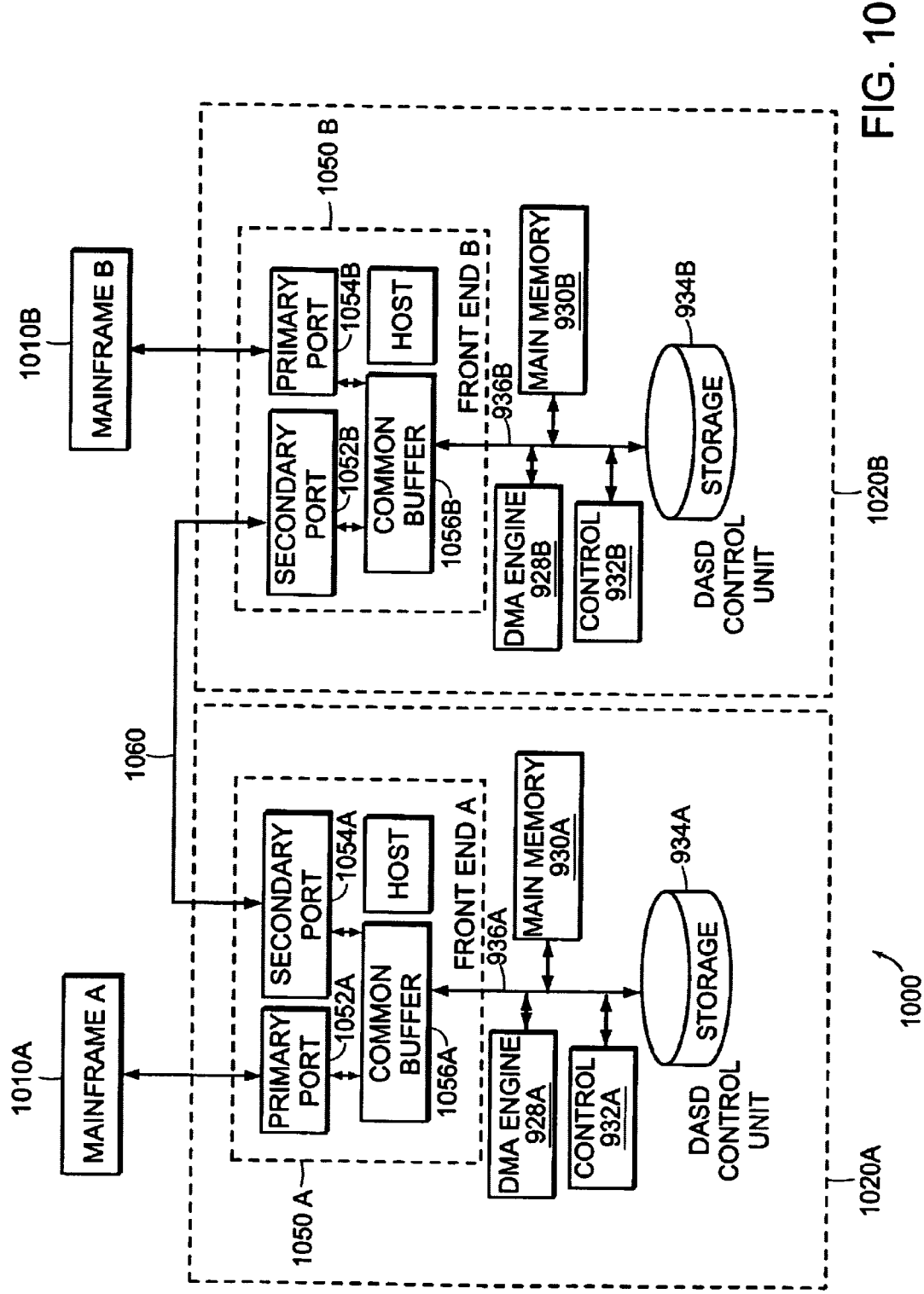

FIG. 10 illustrates an alternate embodiment of clustering using a two port intelligent splitter integrated into control units 1020A, 1020B. The two port splitter operates analogously the three port device described above, except it has two ports. Private link 1060 is used to carry the information between splitters. In the clustering context, the two port device may communicate with the control unit via a bus 268 like that described above, e.g., PCI. To-be-shared information is then cached in the main memory 930 of the control units. Alternatively, in FIG. 10, the control 932 may serve the function of host 262 described above, and memory 930 may serve the function of host memory 264.

In the exemplary embodiments above, the private link may be used to carry the information to be shared as specified in a session definition, for example. This definition would specify the I/O streams of interest passing between respective mainframes and control units. It would also include any necessary synchronization information to ensure that when each mainframe or control unit accesses data that data is coherent. It would also include status information about the respective components. For example, the splitters may be programmed to detect when a respective control unit has gone offline. This may be the result of an error condition or because of an administrative action. In such case, the I/O requests will need to be serviced by the control unit still online. For example, if control unit 920 A goes offline, mainframes 910 A and 910 B would need their I/O requests handled by control unit 920 B. Splitter 200 A would need to then send any I/O from mainframe 910 A to the splitter in front of control unit 920 B to be subsequently handled by 920 B. (This situation is analogous to the arrangement of FIG. 3B; and that discussion is relevant here as well.)

More specifically, with reference to the embodiment of FIG. 9, the intelligent splitters 200 may be appropriately configured to detect relevant I/O stream information (information relevant to the clustering). This configuration may be performed with the assistance of a host 260 (not shown in these figures) as described above. Once so configured, the splitter 200 monitors I/O streams from mainframe hosts (either directly from a port connected to a mainframe or indirectly from a private link connected to another splitter). The splitter also monitors I/O streams from respective control units, e.g., 920 A (either directly from a port connected to a control unit or indirectly from the private link connected to another splitter).

The splitter may then monitor command frames from the mainframes and/or command response frames from the control units to effectively track and detect when writes or reads are to occur to the data of interest and to act accordingly. For example, when a write to a targeted area is detected, the splitter 200 A may send that command frame to the attached control unit, e.g., 920 A, unmodified, via Port C. The splitter 200 will then convey that information on a private link to the other splitter, e.g., 200 B. The sending splitter 200 A may create a modified version of that command frame to reflect a different physical address on control unit 920B, or this modification may be delegated to the splitter 200B. The splitter 200 A may then monitor write command acknowledgment frames from the control units to ensure that each is capable of accepting the command, and to create or retransmit a write command acknowledgment frame to the mainframe that sent the write. For example, the splitter may simply analyze acknowledgment frames from both control units and relay the worst case status to the mainframe. Assuming that the control units can accept the write data, the splitter will send data requests to the mainframe accordingly and subsequently receive data frames in response. These data frames are then sent by the splitter to the control units unmodified (again either directly or indirectly) and can be cached at the respective splitters as well. All frames coming from the control units, e.g., data request and status, are monitored by the splitter, which then creates corresponding messages therefrom to send to the mainframe or which simply retransmit the worst case command received from the control units. For example, if the status information received from the control units indicate that both control units completed the write command successfully, then intelligent splitter 200 reports successful status information back to mainframe computer. However, if the status information received from the control units indicates that one or both of the control units did not complete the command successfully, then intelligent splitter 200 may report an unsuccessful status back to the mainframe-computer. At this point, the mainframe computer would normally invoke its standard recovery procedures to handle the unsuccessful writes. As an alternative, if one or both of the control units reported an unsuccessful status to intelligent splitter 200, intelligent splitter 200 could respond by requesting one or both of the control units to re-execute the write command.

Reads may operate similarly. However, unlike writes, reads need not necessarily be "cluster mirrored."

In addition, the logic to handle switch-overs may be implemented on the mainframe-side or handled by the intelligent splitter (and/or corresponding host 260). For example, by conveying information that a control unit has failed back to the mainframe, the mainframe may then take action by sending I/O streams with address information identifying that the requests should be handled by the other control unit. Alternatively, this form of re-mapping may be handled by the software on the splitter-side.

It will be appreciated that the front end 1050 of the control units 1020 is very similar to the intelligent splitter 200. However, whereas the intelligent splitter includes three communication ports, front end 1050 includes only two communication ports. Also, whereas the internal system associated with intelligent splitter 200 is normally a PC environment (e.g., as shown in FIGS. 2D and 7), front end 1050 is built into and forms an integral part of a control unit. FIG. 10 does not show a processor and processor memory as being a part of front end 1050. However, it will be appreciated that front end 1050 does preferably include a processor memory and a processor (1) that can access buffer 1056 via the system bus 936 and (2) that can access a processor memory.

Other Variations

Various preferred embodiments were described above. Numerous variations of the above are foreseeable. For example, though many of the embodiments are with reference to a splitter cooperating with a separate host, the system may operate with one processor only either in the splitter or as a host. In addition, the general principles described above may be implemented as special purpose systems, for example, that only implement mirroring, instead of generalized platforms as described above. In the case of special purpose systems, the control may be implementable with control logic as opposed to programmatic control. In addition, many of the novelties realized in software (e.g., extended functions at a logical level) are not necessary for the preferred form of splitter and vice versa. For example, one of the many advantages of the intelligent splitter is that it has a common buffer and thus reduces the need for copying data. This novel architecture can stand on its own. Similarly, novel systems may be realized with splitters that do not use a common buffer. For example, a splitter that requires copying of data may be inferior to the preferred splitter described above, yet still be novel over known prior art. Likewise, though repeated reference was made to ESCON embodiments, the principles are applicable to I/O streams in general and may be adapted to SCSI or fibre channel implementation among others. In addition, special situations may benefit from arrangements in which a splitter includes ports for communicating according to multiple protocols, e.g., one port being FC and another ESCON.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. An intelligent splitter system, comprising
   an I/O device having
      input/output (I/O) port logic for transmitting and receiving information on at least three I/O communication links according to a standardized I/O protocol in which I/O operations may be requested on storage locations identified by physical address information; and
      extended function logic, cooperating with the port logic, to perform at least one extended function not specified in the standardized I/O protocol, wherein the at least one extended function operates in a physical address domain of physical addresses; and
   a host system having a processor and memory storing processor-executable instructions to map logical storage object names to a physical address domain and storing instructions to configure the I/O device with a mapped physical address domain to enable the I/O device to perform the at least one extended function on the physical address domain corresponding to a mapped logical storage object name.

2. The intelligent splitter system of claim 1 wherein the host includes a console interface to receive commands having logical storage object names and wherein the host includes instructions to pass a console command to the instructions that map logical storage object names.

3. The intelligent splitter system of claim 1 wherein the host includes instructions to configure the I/O device with a session definition that defines a physical address domain and a corresponding set of actions for the I/O to perform for I/O operations in the defined physical address domain, and wherein the I/O device includes logic for configuring the extended function logic with the session definition.

4. The intelligent splitter system of claim 1 wherein the I/O device includes service request logic to create and send I/O information on a specified communication link connected to the I/O device, and wherein the host includes instructions to communicate a service request to the I/O device, specifying an I/O operation and a physical address to invoke the service request logic of the I/O device.

5. The intelligent splitter system of claim 4 wherein the service request specifies an I/O operation and physical address to cause the I/O device to transmit a channel command word (CCW) on a communication link.

6. The intelligent splitter system of claim 1
   wherein the I/O device includes a processor and memory having processor-executable instructions to implement the extended function logic and processor-executable instructions defining a first application program interface (API) specifying functionality provided by the I/O device,
   wherein the host system memory further includes processor-executable instructions defining a second API, specifying functionality provided by the host system, and
   wherein the second API includes processor-executable instructions to invoke the first API.

7. The intelligent splitter system of claim 1 further comprising a network connection, and wherein the host memory includes processor-executable instructions to transmit requests over the network connection to obtain information describing storage at a target communication node of a network on which the network connection is connected, and wherein the host memory further includes processor-executable instructions to transmit information received in reply to such requests to the instructions that map logical storage object names to a physical address domain.

8. The intelligent splitter system of claim 1 further comprising I/O logic to transmit and receive information according to another standardized I/O protocol, and wherein the host memory further includes processor-executable instructions to transmit and receive information to the I/O logic.

9. A method of managing data within an I/O system having a first device, a second device, and a third device, wherein each device is capable of transmitting and receiving I/O information organized according to a standardized I/O protocol, wherein the standardized I/O protocol has an associated set of I/O functions, the method comprising the acts of:
   receiving a command to perform an extended function on data identified by a logical object name;
   mapping the logical object name to a physical address domain;
   monitoring a communication link in the I/O system to determine if the link is carrying an I/O operation in the mapped physical address domain;
   if an I/O operation is being carried on the link within the mapped physical address domain, intercepting that operation and performing the extended function identified in the received command.

10. The method of claim 9 wherein the I/O protocol is frame-based with each frame having a header component and a payload component, and wherein the act of performing the extended function identified in the received command includes the acts of
   receiving an I/O frame from one of the first, second, and third devices;
   altering a header component of the frame;
   transmitting the altered header component to another of the first, second, and third devices.

11. The method of claim 9 wherein the I/O protocol is frame-based with each frame having a header component and a payload component, and wherein the act of performing the extended function identified in the received command includes the acts of
   receiving an I/O frame from one of the first, second, and third devices;
   altering a payload component of the frame;
   transmitting the altered payload component to another of the first, second, and third devices.

12. The method of claim 9 wherein the I/O protocol is frame-based with each frame having a header component and a payload component, and wherein the act of performing the extended function identified in the received command includes the acts of
   receiving an I/O frame from one of the first, second, and third devices;
   analyzing the frame;
   transmitting an I/O frame to another of the first, second, and third devices, while transmitting another I/O frame to the last of the first, second, and third devices in parallel.

13. A method of managing data within an I/O system having a first device, a second device, and a third device, wherein each device can transmit and receive I/O information organized according to a standardized I/O protocol having an associated set of I/O functions defined in the protocol, the method comprising the acts of:

receiving I/O information from the first, second, and third devices into a splitter system capable of and transmitting and receiving I/O information among the first, second, and third devices;

causing the splitter device to generate I/O information independently of received I/O information;

causing the splitter to transmit the generated I/O information to at least one of the first, second, and third devices.

14. The method of claim 13 wherein the generated I/O information is a channel command word (CCW).

15. The method of claim 13 wherein the act of transmitting the generated I/O information includes the acts of transmitting the information according to a predefined state machine to control the transmission according to a multiphase protocol.

* * * * *